(12) United States Patent
Halder et al.

(10) Patent No.: US 11,709,495 B2
(45) Date of Patent: Jul. 25, 2023

(54) SYSTEMS AND METHODS FOR TRANSFER OF MATERIAL USING AUTONOMOUS MACHINES WITH REINFORCEMENT LEARNING AND VISUAL SERVO CONTROL

(71) Applicant: SafeAI, Inc., Milpitas, CA (US)

(72) Inventors: Bibhrajit Halder, Sunnyvale, CA (US); Koushik Balasubramanian, Tamil Nadu (IN); Lalin Theverapperuma, Santa Clara, CA (US)

(73) Assignee: SafeAI, Inc., Milpitas, CA (US)

( * ) Notice: Subject to any disclaimer, the term of this patent is extended or adjusted under 35 U.S.C. 154(b) by 97 days.

(21) Appl. No.: 16/835,099

(22) Filed: Mar. 30, 2020

(65) Prior Publication Data

US 2020/0310442 A1  Oct. 1, 2020

Related U.S. Application Data

(60) Provisional application No. 62/826,961, filed on Mar. 29, 2019, provisional application No. 62/826,740, filed on Mar. 29, 2019.

(51) Int. Cl.
*G05D 1/02* (2020.01)
(52) U.S. Cl.
CPC ......... *G05D 1/0212* (2013.01); *G05D 1/0251* (2013.01)

(58) Field of Classification Search
CPC .. G05D 1/0212; G05D 1/0251; G05D 1/0246; G05D 1/028; G05D 2201/021; G05D 1/0221; E02F 9/2045
See application file for complete search history.

(56) References Cited

U.S. PATENT DOCUMENTS

| | | | |
|---|---|---|---|
| 8,195,342 B2* | 6/2012 | Anderson | G05D 1/0088 701/1 |
| 2017/0073925 A1* | 3/2017 | Friend | E02F 9/261 |
| 2018/0300882 A1* | 10/2018 | Kim | G06V 10/26 |
| 2020/0293059 A1* | 9/2020 | Wang | G06V 20/64 |
| 2020/0327662 A1* | 10/2020 | Liu | G06T 7/10 |
| 2021/0012163 A1* | 1/2021 | Li | E02F 9/261 |

* cited by examiner

*Primary Examiner* — Jess Whittington
(74) *Attorney, Agent, or Firm* — Kilpatrick Townsend & Stockton LLP

(57) ABSTRACT

Systems and methods enable an autonomous vehicle to perform an iterative task of transferring material from a source location to a destination location, such as moving dirt from a pile, in a more efficient manner, using a combination of reinforcement learning techniques to select a motion path for a particular iteration and visual servo control to guide the motion of the vehicle along the selected path. Lifting, carrying, and depositing of material by the autonomous vehicle can also be managed using similar techniques.

20 Claims, 17 Drawing Sheets

SYSTEMS AND METHODS FOR TRANSFER OF MATERIAL USING AUTONOMOUS MACHINES WITH REINFORCEMENT LEARNING AND VISUAL SERVO CONTROL

CROSS-REFERENCES TO RELATED APPLICATIONS

This application claims the benefit of U.S. Provisional Application No. 62/826,961, filed Mar. 29, 2019, and of U.S. Provisional Application No. 62/826,740, filed Mar. 29, 2019. The disclosures of both applications are incorporated by reference herein in their entirety.

TECHNICAL FIELD

The present disclosure relates generally to the operation of autonomous machinery to perform various tasks at various industrial work sites and more particularly to systems and methods for transfer of material from a source location to a destination location using autonomous machines with a combination of reinforcement learning and visual servo control.

BACKGROUND

Autonomous machinery can be used in construction, mining, and other industrial operations to reduce the need for human labor and the attendant risks of injury or death. Autonomous machinery is typically outfitted with a variety of environmental sensors (e.g., cameras, LIDAR, etc.) to collect data about the surroundings and control logic to interpret the sensor data (e.g., detecting nearby objects) and regulate action of the machinery accordingly, allowing the machinery to perform a desired operation while avoiding collisions with other objects. When the control logic is unable to interpret the sensor data with high confidence, the machinery may stop and wait for input from a human supervisor.

Automation of common tasks performed at industrial sites poses a number of challenges. For example, the task of moving a pile of dirt from one location to another using a machine that has a scoop is conventionally performed using a human-operated machine. The operator observes the dirt pile and determines the optimal location and direction for scooping dirt, taking into account the size and shape of the dirt pile as well as the surrounding terrain (e.g., where the vehicle can be positioned). In so doing, the operator does not consciously employ any particular algorithm or computations; instead, the operator makes an intuitive decision guided by general knowledge and experience. The operator then drives the machine into position and operates the scoop to scoop up a load of dirt. The operator then drives the machine to the destination location and operates the scoop to deposit the load at the destination location. Typically, multiple iterations of this process are required to move the entire pile. At each iteration, the action of scooping dirt changes the size and shape of the remaining dirt pile. For instance, when a machine scoops dirt from a pile, some amount of dirt is displaced, some of which may fall back into a previously scooped location. Accordingly, at each iteration of the process of moving the dirt pile, the operator may make different decisions about the optimal location for taking the next scoop and/or the route to get to that location, depending on the current state of the pile.

Currently, a machine can be programmed to perform a task such as moving dirt by following a pre-programmed route. However, because the effect of scooping on the dirt pile cannot be predicted, it is not possible to pre-program an optimal sequence of scooping operations to move a pile of dirt.

SUMMARY

Disclosed herein are examples, or embodiments, of systems and methods for transfer of material from a source location to a destination location using autonomous machines with a combination of reinforcement learning and visual servo control. Systems and methods of the kind described herein can enable an autonomous vehicle to perform an iterative task of transferring material from a source location to a destination location, such as moving dirt from a pile, in a more efficient manner, using a combination of reinforcement learning techniques to select a motion path for a particular iteration and visual servo control to guide the motion of the vehicle along the selected path. Lifting, carrying, and depositing of material by the autonomous vehicle can also be managed using similar techniques.

Various embodiments relate to control systems for autonomous vehicles, to processes that can be executed in control systems for autonomous vehicles, and/or to computer-readable storage media encoded with program instructions that can cause a processor to perform various processes. In some embodiments, a method for controlling an autonomous vehicle includes receiving, at a control system of the autonomous vehicle, an instruction to move material from a source location to a destination location. The amount and arrangement of material may be such that moving all of the material requires multiple iterations of a transfer operation. The control system can identify the source location within an image provided by sensors (e.g., cameras and/or LIDAR) mounted on the autonomous vehicle. For each iteration of the transfer operation, the control system can determine an approach vector for picking up a portion of the material. The approach vector can be different for different iterations, and the approach vector for any given iteration can be determined independently of past iterations (e.g., based on the current distribution, arrangement, or shape of the material to be moved). The control system can determine a current location of the autonomous vehicle relative to the approach vector (e.g., by analyzing sensor data including three dimensional (3D) images generated from sensor data). The control system can execute a visual servo control loop to move the autonomous vehicle from the current location to the approach vector. After reaching the approach vector, the control system can operate the autonomous vehicle to pick up a portion of the material, then execute the visual servo control loop again to move to the destination location. After reaching the destination location, the control system can operate the autonomous vehicle to release the portion of the material. Additional iterations of the transfer operation can be performed until all of the material has been moved.

In some embodiments, the material may be arranged in a pile or other disorderly arrangement at the source location, and the control system can determine the approach vector based on a shape of the pile. For instance, a 3D model (such as a mesh model or voxel model) of the pile can be generated based on the sensor data, and candidate locations for the next transfer operation can be identified based on the 3D model, e.g., based on identifying regions with the highest density of mesh nodes or voxels. Selection among candidate locations can be based on comparing approach vectors for reaching each of the candidate locations.

In some embodiments, the visual servo control loop can be based on a comparison of real-time image data from the sensors of the autonomous vehicle to a target image associated with the approach vector. Control commands can be selected based on a reinforcement learning model that is trained independently of a kinematic model of the autonomous vehicle, so that it is not necessary for the control system to know exactly how the autonomous machine will respond to a particular control command, which can be useful where the response depends on variable factors such as terrain, weight of load, etc.

The following detailed description, together with the accompanying drawings, will provide a better understanding of the nature and advantages of the claimed invention.

DETAILED DESCRIPTION

The following description of embodiments of the invention is presented for the purpose of illustration and description. It is not intended to be exhaustive or to limit the invention to the precise form described, and persons skilled in the art will appreciate that many modifications and variations are possible. The embodiments have been chosen and described in order to best explain the principles of the invention and its practical applications to thereby enable others skilled in the art to best utilize the invention in various embodiments and with various modifications as are suited to the particular use contemplated.

The present disclosure describes several embodiments in the context of an autonomous vehicle. The use of the term "vehicle" and description with respect to a vehicle is not intended to be limiting or restrictive. Embodiments described herein can be used with and applied to any autonomous equipment, including autonomous vehicles and other types of autonomous machines that are configured to perform one or more tasks or operations in an automated manner, substantially free of human intervention. Such vehicles or machines may be capable of locomotion (e.g., driving from place to place) and/or operation of an articulating member, such as an arm, scoop, bucket, claw, pincer, or other articulating member, to perform various tasks involving the lifting and carrying of material.

Autonomous Vehicles

Figure 1A:
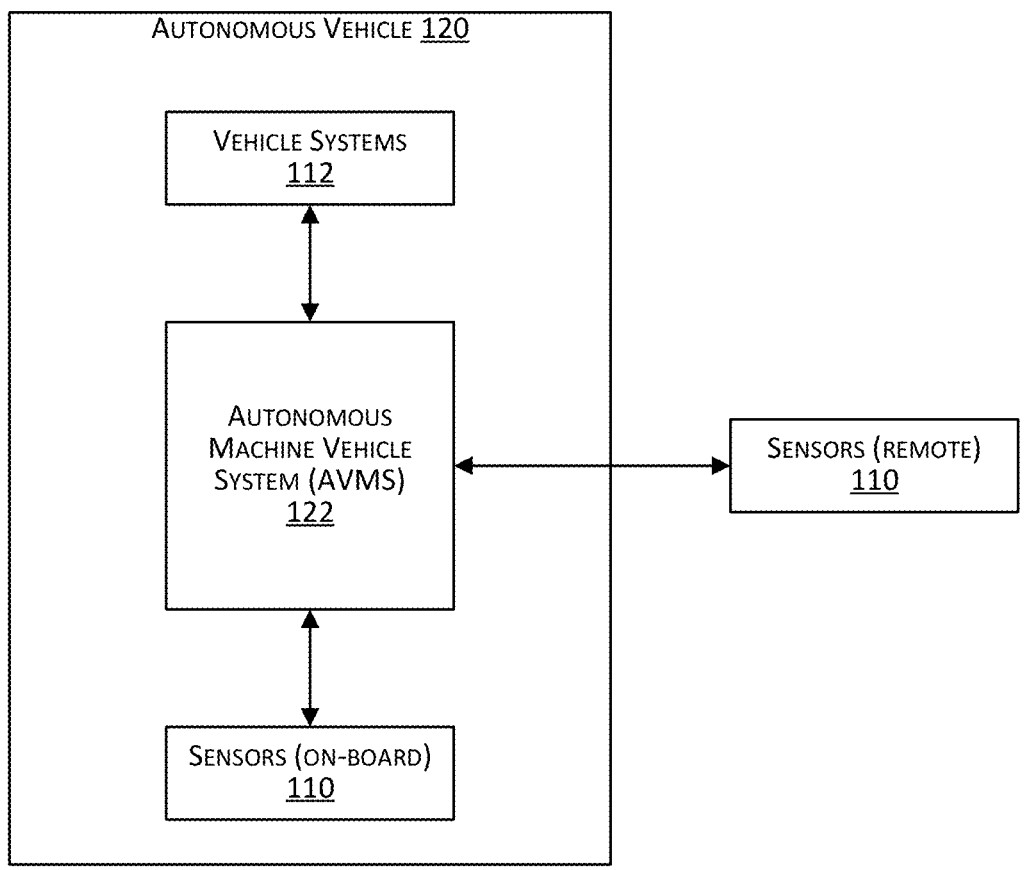
FIG. 1A is a high level simplified block diagram of an autonomous vehicle incorporating a controller system according to certain embodiments.

FIG. 1A is a high level simplified block diagram of an autonomous vehicle 120 incorporating a controller system (referred to herein as autonomous vehicle management system (AVMS) 122) according to certain embodiments. For purposes of this disclosure, an autonomous vehicle, such as autonomous vehicle 120, is a vehicle that is capable of performing one or more operations autonomously and substantially free of any human user or manual input. For example, in certain embodiments, the autonomous operation may be the ability of the vehicle 120 to autonomously sense its environment and navigate or drive along a path autonomously and substantially free of any human user or manual input. Examples of other autonomous operations include, without limitation, scooping and dumping operations, moving materials or objects (e.g., moving dirt or sand from one area to another), lifting materials, driving, rolling, spreading dirt, excavating, transporting materials or objects from one point to another point, and the like.

Autonomous vehicle 120 can be of various different types. For example, autonomous vehicle 120 can be a car or mobile machine that can be used to transport people and/or cargo. Autonomous vehicle 120 can be a specialized vehicle for performing specialized operations such as road or path compacting, rolling, digging, lifting, etc. Examples of autonomous vehicle 120 include without restriction wagons, bicycles, motor vehicles (e.g., motorcycles, cars, trucks, buses), railed vehicles (e.g., trains, trams), watercraft (e.g., ships, boats), aircraft, spacecraft, and/or heavy equipment vehicles (e.g. dump trucks, tractors, bulldozers, excavators, forklifts, etc.). Since the environment of autonomous vehicle 120 can include other vehicles, including other autonomous vehicles, for purposes of clarity, in order to differentiate autonomous vehicle 120 from other vehicles in its environment, autonomous vehicle 120 is also sometimes referred to as the ego vehicle.

Various features are described below using an autonomous vehicle as an example. However, this is not intended to be limiting. The teachings described herein can be applied to any machine that is capable of performing one or more autonomous operations. For example, the teachings can be used by a loader, a compactor, a crane, and the like. The machines may be used in various industries such manufacturing, mining, construction, medical applications, packaging, assembly, surveying, mapping, logistics, etc.

As depicted in FIG. 1A, in addition to autonomous vehicle management system 122, autonomous vehicle 120 may include or be coupled to sensors 110 and vehicle systems 112. Autonomous vehicle management system 122 may be communicatively coupled with sensors 110 and vehicle systems 112 via wired or wireless links. One or more different communication protocols may be used for facilitating communications between autonomous vehicle management system 122 and sensors 110 and between autonomous vehicle management system 122 and vehicle systems 112.

Vehicle systems 112 can include various electro-mechanical systems, components, linkages, etc. that enable autonomous vehicle 120 to perform its intended functions such as traveling or navigating along a particular path or course. Vehicle systems 112 may include for example, a steering system, a throttle system, a braking system, a propulsion system, etc. for driving the autonomous vehicle; electrical systems; auxiliary systems (e.g., systems for outputting information to a driver or passenger of autonomous vehicle 120); and the like. Vehicle systems 112 can be used to set the path and speed of autonomous vehicle 120. In an autonomous vehicle that is configured to perform a specialized operation (e.g., a dump truck that is specialized to perform lift and dump operations, a tractor, etc.), the vehicle systems 112 may also include systems that are configured to perform such specialized operations.

Figure 3:
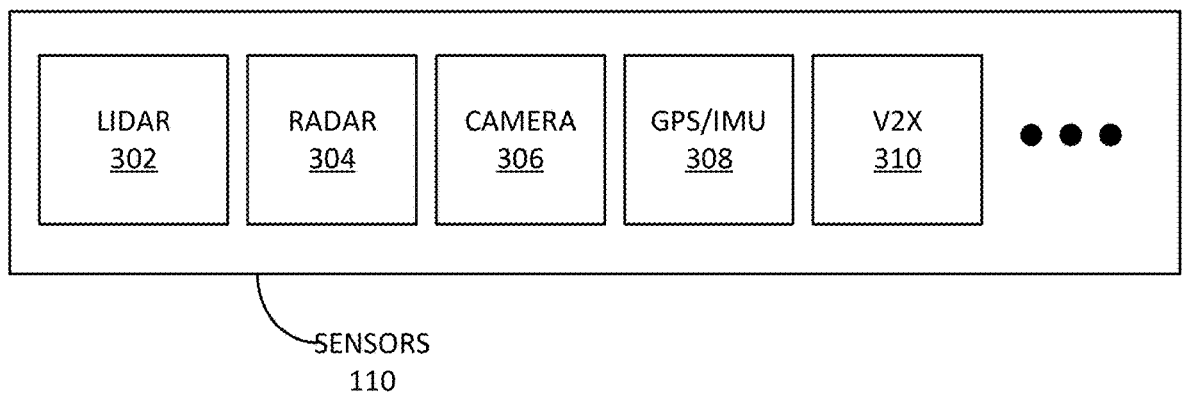
FIG. 3 illustrates an example set of sensors of an autonomous vehicle according to some embodiments.

Sensors 110 may be located on or in autonomous vehicle 120 ("onboard sensors") or may be located remotely ("remote sensors") from autonomous vehicle 120. Autonomous vehicle management system 122 may be communicatively coupled with remote sensors via wireless links using a wireless communication protocol. Sensors 110 can obtain environmental information for autonomous vehicle 120. This sensor data can then be fed to autonomous vehicle management system 122. FIG. 3 illustrates an example set of sensors 110 of an autonomous vehicle according to some embodiments. As shown, sensors 110 can include, without limitation, LIDAR (Light Detection and Ranging) sensors 302, radar 304, cameras 306 (different kinds of cameras with different sensing capabilities may be used), Global Positioning System (GPS) and Inertial Measurement Unit (IMU) sensors 308, Vehicle-to-everything (V2X) sensors 310, audio sensors, and the like. Sensors 110 can obtain (e.g., sense, capture) environmental information for autonomous vehicle 120 and communicate the sensed or captured sensor data to autonomous vehicle management system 122 for processing. Other sensors may include proximity sensors, SONAR sensors, and other sensors.

Examples of radar sensors 304 (e.g., long range radar, short range radar, imaging radar etc.) may include sensors that are used to detect objects in the environment of autonomous vehicle 120 and to determine the velocities of the detected objects. Examples of LIDAR sensors 302 include sensors that use surveying techniques that measure distances to a target by using light in the form of a pulsed laser light. This is done by illuminating the target to be measured with pulsed laser light and measuring the reflected pulses using the sensor. Examples of V2X sensors include sensors that use V2X communication technology to communicate with moving (or stationary) parts of a traffic system. For example, autonomous vehicle 120 may use a V2X sensor for passing and/or receiving information to or from another entity around or near the autonomous vehicle. A V2X communication sensor/system may incorporate other more specific types of communication infrastructures such as V2I (Vehicle-to-Infrastructure), V2V (Vehicle-to-vehicle), V2P (Vehicle-to-Pedestrian), V2D (Vehicle-to-device), V2G (Vehicle-to-grid), and the like. An IMU sensor may be an electronic device that measures and reports a body's specific force, angular rate, and sometimes the magnetic field surrounding the body, using a combination of accelerometers, gyroscopes, magnetometers, etc. GPS sensors use a space-based satellite navigation system to determine geolocation and time information.

In certain embodiments, data obtained from different types of sensors and/or from multiple instances of the same type of sensor may be combined or fused to form a three-dimensional (3D) representation of a scene around the autonomous vehicle, including objects therein, as well as information about the current state of various objects (stationary, in motion, current speed and direction of motion). Various types of sensor combinations may be employed for the purpose of obtaining data for generating the 3D representation. Combining different sensor types has certain advantages. For example, cameras are capable of generating highly detailed images of the environment and/or objects within the environment, whereas LIDAR and radar provide better depth perception. LIDAR is generally more accurate than radar when detecting stationary objects, whereas radar is more accurate at detecting moving objects. As described below, the ability to detect and identify objects may be affected by environmental dust, and in various embodiments, a dust filter can be applied to improve the reliability of object detection and identification.

Autonomous vehicle management system 122 (also referred to as a controller system) is configured to process data describing the state of autonomous vehicle 120 and the state of the autonomous vehicle's environment and, based upon the processing, to control one or more autonomous functions or operations of autonomous vehicle 120. For example, autonomous vehicle management system 122 may issue instructions/commands to vehicle systems 112 to programmatically and autonomously control various aspects of the autonomous vehicle's motion such as the propulsion, braking, steering or navigation, and auxiliary (e.g., turning lights on) functionality of autonomous vehicle 120. Autonomous vehicle management system 122 implements the control and planning algorithms that enable autonomous vehicle 120 to perform one or more operations autonomously.

Autonomous vehicle management system 122 may be implemented using software only, hardware only, or combinations thereof. The software may be stored on a non-transitory computer readable storage medium (e.g., on a memory device) and may be executed by one or more processors (e.g., by computer systems) to perform its functions. In the embodiment depicted in FIG. 1A, autonomous vehicle management system 122 is shown as being in or on autonomous vehicle 120. This is however not intended to be limiting. In alternative embodiments, autonomous vehicle management system 122 can also be remote from autonomous vehicle 120.

Autonomous vehicle management system 122 receives sensor data from sensors 110 on a periodic or on-demand basis. Autonomous vehicle management system 122 uses the sensor data received from sensors 110 to perceive the autonomous vehicle's surroundings and environment. Autonomous vehicle management system 122 uses the sensor data received from sensors 110 to generate and keep updated a digital model that encapsulates information about the state of autonomous vehicle 120 and of the space and environment surrounding autonomous vehicle 120. This digital model may be referred to as an internal map, which encapsulates the current state of autonomous vehicle 120 and its environment. The internal map along with other information is then used by autonomous vehicle management system 122 to make decisions regarding actions (e.g., navigation, braking, acceleration, scooping, dumping, etc.) to be performed by autonomous vehicle 120. Autonomous vehicle management system 122 may send instructions or commands to vehicle systems 112 to cause the actions be performed by components of vehicles systems 112.

Figure 1B:
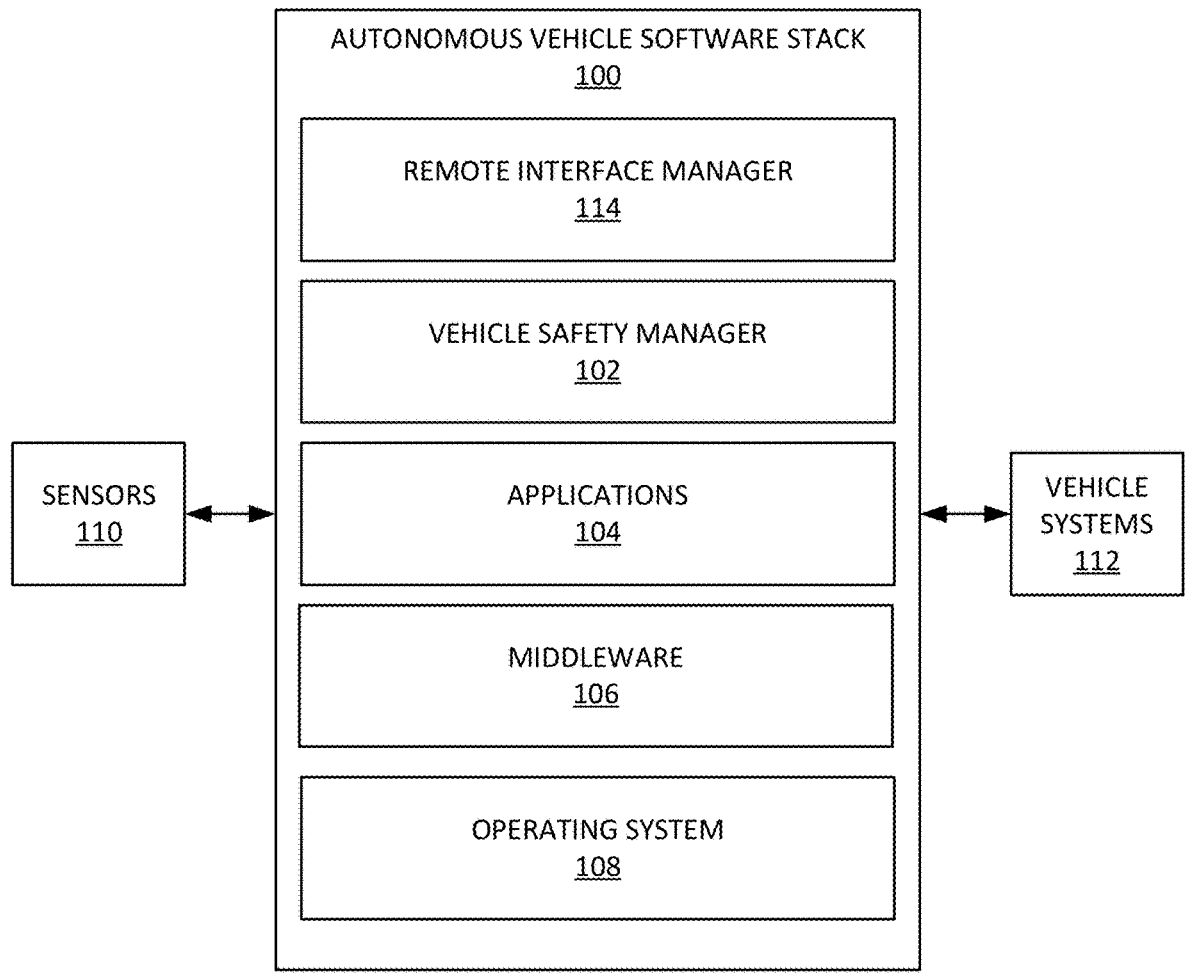
FIG. 1B depicts an example autonomous vehicle management system implemented primarily in software, according to some embodiments.

As indicated above, autonomous vehicle management system 122 may be implemented using software only, hardware only, or combinations thereof. FIG. 1B depicts an example autonomous vehicle management system wherein autonomous vehicle management system 122 is implemented primarily in software, according to some embodiments. Autonomous vehicle management system 122 may be implemented as a fully autonomous vehicle software stack 100. Fully autonomous vehicle software stack 100 can include a vehicle safety manager 102, a remote interface manager 114, applications 104, middleware 106, and operating system 108. Fully autonomous vehicle software stack 100 may be used to implement the functionalities of the various systems and subsystems described above.

Figure 2A:
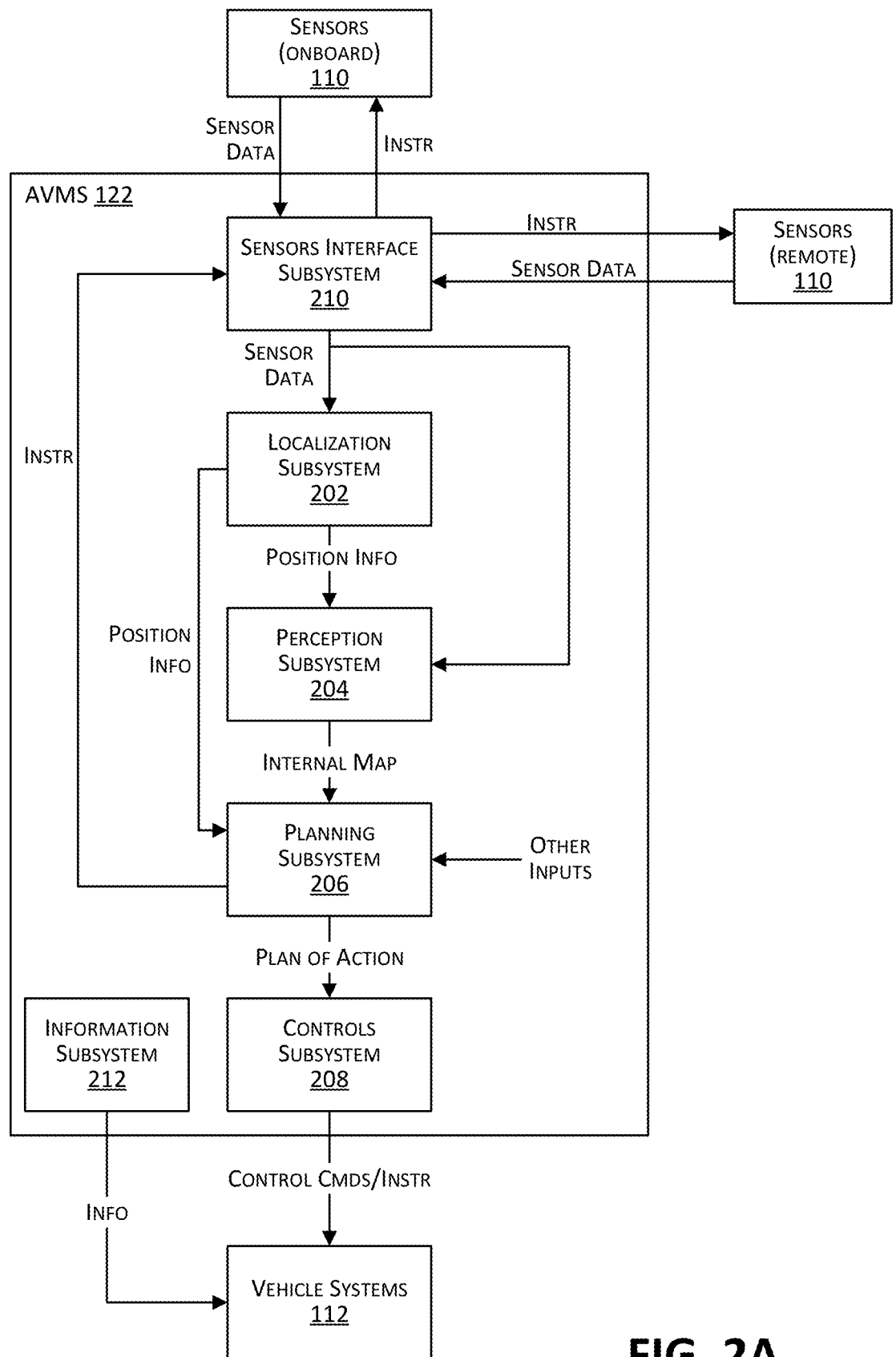
FIG. 2A is a simplified block diagram depicting subsystems of an autonomous vehicle management system according to some embodiments.

FIG. 2A is a simplified block diagram depicting subsystems of autonomous vehicle management system 122 according to some embodiments. Autonomous vehicle management system 122 may comprise multiple systems or subsystems communicatively coupled to each other via one or more communication channels. In the embodiment depicted in FIG. 2A, the subsystems include a sensors interface subsystem 210, a localization subsystem 202, a perception subsystem 204, a planning subsystem 206, a controls subsystem 208, and an information subsystem 212.

Autonomous vehicle management system 122 depicted in FIG. 2A is merely an example and is not intended as limiting. One of ordinary skill in the art would recognize many possible variations, alternatives, and modifications. For example, in some implementations, autonomous vehicle management system 122 may have more or fewer subsystems or components than those shown in FIG. 2A, may combine two or more subsystems, or may have a different configuration or arrangement of subsystems. The subsystems may be implemented using software only, hardware only, or combinations thereof. In the embodiment depicted in FIG. 2A, autonomous vehicle management system 122 and all its subsystems are shown as being in or on autonomous vehicle 120. This is however not intended to be limiting. In alternative embodiments, all the subsystems of autonomous vehicle management system 122 or certain subsystems of autonomous vehicle management system 122 can also be remote from autonomous vehicle 120.

Sensors interface subsystem 210 provides an interface that enables communications between sensors 110 (including on-board sensors and/or remote sensors) and autonomous vehicle management system 122. Sensors interface subsystem 210 may receive sensor data from sensors 110 and provide the data to one or more other subsystems of autonomous vehicle management system 122. For example, as depicted in FIG. 2A, sensor data may be provided to localization subsystem 202 and perception subsystem 204 for further processing. The sensor data collected by the various sensors 110 enables autonomous vehicle management system 122 to construct a view or picture of autonomous vehicle 120 and its surrounding environment.

In certain embodiments, one or more subsystems of autonomous vehicle management system 122 can send instructions or commands to one or more sensors 110 to control the operations of the one or more sensors. For example, instructions may be sent to a particular sensor to change the behavior of the particular sensor. For example, instructions may be sent to a sensor to change the information sensed or collected by the sensor and/or to change the sensor data communicated from the sensor to autonomous vehicle management system 122. Using these instructions, autonomous vehicle management system 122 can dynamically control the sensor data that is communicated from sensors 110 to autonomous vehicle management system 122. Further details are provided below in the context of functions performed by planning subsystem 206.

Localization subsystem 202 is configured to receive sensor data from sensors 110 and, based upon the sensor data, to identify the location of autonomous vehicle 120 in its surrounding environment (vehicle localization). Localization subsystem 202 provides current, local position information of the ego vehicle with respect to its environment (example: a mine). The position of the ego vehicle may be determined with respect to a pre-defined map that is generated by perception subsystem 204. In certain embodiments, localization subsystem 202 is configured to broadcast the ego vehicle's position information to other systems or subsystems of autonomous vehicle 120. The other systems or subsystems may then use the position information as needed for their own processing.

Localization subsystem 202 may implement various functions such as internal map management, map matching, visual odometry, dead reckoning, location history management, and the like. For example, assume that autonomous vehicle 120 is driving in a mine. Localization subsystem 202 may receive as input a map of the mine. A mine usually has a set path comprising drivable and non-drivable areas and a set road for mining vehicles to follow around a mine. Localization subsystem 202 may determine the position of the ego vehicle along the path. Localization subsystem 202 may do so by utilizing multiple inputs it receives from sensors and maps of the environment. Localization subsystem 202 may use GPS sensor data to determine the global positioning of the ego vehicle. Localization subsystem 202 may receive the GPS sensor data and translate it to a more useful form that is usable by one or more other subsystems of autonomous vehicle management system 122. For example, localization subsystem 202 may identify where the ego vehicle is positioned with respect to a map of the environment, such as a mine map. (Identification of the ego vehicle's position with respect to a map is also referred to as map management).

Localization subsystem 202 may also be configured to perform map matching, where what localization subsystem 202 perceives is matched with the information that it has. Map matching can match recorded geographic coordinates to a logical model of the real world (e.g., using a Geographic Information System model, etc.). In one example, a map matching algorithm can obtain a recorded series of location points (e.g. from GPS) and relate them to edges in an existing street graph (e.g., as a network). This can be in a sorted list representing the travel of an autonomous vehicle. As part of map matching, localization subsystem 202 can track the ego vehicle in its environment and deduce its position based on what localization subsystem 202 sees relative to a map, such as a real world map.

Localization subsystem 202 may also be configured to perform visual odometry, which involves determining the orientation and position of the ego vehicle based upon sensor data, such as by analyzing images captured by one or more cameras.

Localization subsystem 202 may also perform dead reckoning processing. Dead reckoning is the process of calculating one's current position by using a previously determined position, or fix, and advancing that position based upon known or estimated speeds over elapsed time and course. This may involve calculating the ego vehicle's position by estimating the direction and distance travelled. For example, autonomous vehicle management system 122 can receive and maintain certain information about autonomous vehicle 120 such as its wheel speed, steering angle, where autonomous vehicle 120 was a second ago, and the like. Based on the past position information and in combination with speed, steering angle etc., localization subsystem 202 can determine the vehicle's next location or current location. This provides local understanding of the ego vehicle's position as it moves on its path. A path can be a road, highway, rail system, runway, boat route, bike path, etc., according to various embodiments.

Localization subsystem 202 may also perform local history management tracking, where historical information about the ego vehicle's path is analyzed and compared to the current path. For example, if autonomous vehicle 120 drives along a certain path in a mine multiple times, information from different instances of driving along the path can be compared and analyzed by localization subsystem 202.

Localization subsystem 202 may also implement a consistency module that is configured to perform rationality checks, deficiency checks, normalize sensor data, etc. For example, localization subsystem 202 may receive information from different sources of information regarding the ego vehicle's position, location, etc. A rationality check may be used to do a validity check to make sure information from various sensors is consistent and robust. This helps reduce erroneous results. The rationality check can include tests to evaluate whether a sensor data value and/or the result of a calculation can possibly be true given other sensor data values and/or calculation results. The sensor data received from sensors 110 can also be normalized and the normalized sensor data then provided to localization subsystem 202. Localization subsystem 202 can then utilize the normalized sensor data to generate and/or update the consistent internal map of the real-time (e.g., assuming networking and processing latencies, etc.) environment of the autonomous vehicle.

Perception subsystem 204, periodically or on-demand, receives sensor data from sensors 110 and builds and maintains a consistent internal map based upon the received information. Perception subsystem 204 may also receive inputs from other sources, such as from localization subsystem 202, and use the received inputs to build and maintain the internal map. The internal map generated by perception subsystem 204 contains all the information including the ego vehicle's information, state of the ego vehicle and its environment, information about objects in the ego vehicle's environment (e.g., information regarding dynamic and static objects around the ego vehicle). A consistent internal map can be a localized map of sensed entities/objects in the autonomous vehicle's environment, for example, around the autonomous vehicle. In certain embodiments, these sensed entities/objects are mapped in three dimensions (3D). In certain embodiments, perception subsystem 204 receives position information from localization subsystem 202 and incorporates the position information in the internal map. The internal map can be maintained even in the event that a sensor falls offline.

Rationality checks and normalization may be performed on the sensor data received by perception subsystem 204. These checks can include tests to evaluate whether a sensor data value and/or the result of a calculation can possibly be true. The sensor data received from sensors 110 can also be normalized and the normalized sensor data then provided to perception subsystem 204. Perception subsystem 204 can then utilize the normalized sensor data to generate and/or update the consistent internal map of the real-time environment of the autonomous vehicle.

Perception subsystem 204 may use various different algorithms and techniques to perform its functions, including artificial intelligence (AI) and machine learning based techniques. For example, perception subsystem 204 may use a convolutional neural network (CNN) or other deep-learning neural network (DNN) to perform object detection and object classification based upon the sensor data. During a training phase, the DNN may be trained using labeled training data comprising sample images of a vehicle's environment and corresponding ground truth classifications. Labeled data generally includes a group of sample images that have been tagged with one or more labels, where the labels represent known results (e.g., ground truth classification, etc.) for the sample images. Labeling can also be used to take a set of unlabeled data and augment each piece of that unlabeled data with meaningful tags that are informative. A CNN model or other AI/machine learning model built based upon labeled training data may then be used in real time to identify and classify objects in the environment of autonomous vehicle 120 based upon new sensor data received from sensors 110.

Planning subsystem 206 is configured to generate a plan of action for autonomous vehicle 120. The plan may comprise one or more planned actions or operations to be performed by autonomous vehicle 120. For example, the plan may comprise information identifying a trajectory or path to be traversed by autonomous vehicle 120. A path can be a road, highway, rail system, runway, boat route, bike path, etc., according to various embodiments. For example, the trajectory information may indicate how the vehicle should move from point A to point B with a list of points between point A point B marking a trajectory for the vehicle to follow from point A to point B. As another example, the plan generated by planning subsystem 206 may include planned actions with respect to accessories of autonomous vehicle 120, such as turning indicators or lights on or off, producing one or more sounds (e.g., alarms), and the like. In situations where autonomous vehicle 120 has specialized components that are customized to perform specialized operations, the plan generated by planning subsystem 206 may also include planned actions to be performed by one or more of these specialized components. For example, if the autonomous vehicle is a digging truck with a bucket and arm assembly for performing the digging and moving of materials, the plan generated by planning subsystem 206 can include actions to be performed by the bucket and arm assembly for performing the digging. For example, the plan may include an angle at which the arm should be raised and or the angle of the bucket with respect to the arm. After a plan of action has been generated, planning subsystem 206 may communicate the plan of action to controls subsystem 208, which may then control one or more systems of vehicle systems 112 to cause the planned actions in the plan of action to be performed in a safe manner by autonomous vehicle 120.

In addition to the internal map generated by perception subsystem 204, planning subsystem 206 may also receive various other inputs that it uses in generating the plan of action for autonomous vehicle 120. These inputs may include, without limitation: (a) position or localization information received from localization subsystem 202; (b) information identifying one or more goals of autonomous vehicle 120 (examples are described below); (c) high level route information regarding the path or route to be taken by autonomous vehicle 120 (which may be provided directly or indirectly by an end user or operator of the autonomous vehicle); (d) information identifying safety considerations (examples are described below); (e) information about how a particular operation was performed in the past (examples are described below; and (f) other information.

Information identifying a goal may be set by an end user or operator of the autonomous vehicle or machine. For an automotive example, the user may set a high-level goal to drive from the current location of autonomous vehicle 120 to a particular final destination. Autonomous vehicle 120 may determine a GPS route plan based upon the current and final destination locations and a map showing existing roads, with a goal to autonomously drive from the current location to the final destination according to the GPS route plan. In a mining environment example, a high-level goal set by an operator may be to move ten tons of material (e.g., sand, coal, etc.) from point A and dump the material at point B. In general, one or more different goals may be provided. Examples of categories of goals (some of which may overlap) include, without limitation: goals related to performing an autonomous operation by the autonomous vehicle (e.g., autonomous driving or navigation along a path, scooping and dumping operations, moving materials or objects, lifting materials, driving, rolling, spreading dirt, excavating, transporting materials or objects from one point to another point, etc.); goals related to maneuvering the vehicle (e.g., turning through a particular angle); goals related to interaction of the vehicle with various actors, objects, etc. in the vehicle's environment; goals related to the general operations of the vehicle; and the like. Examples of goals include: changing lanes, driving from one location to another location, driving to a destination as fast as possible, making a turn, performing a series of steps in a sequence, and others.

Information identifying safety considerations may be provided to the autonomous vehicle by an end user/operator, etc. using APIs provided by autonomous vehicle 120 or via metadata configured for autonomous vehicle 120. Examples of information identifying safety considerations may include, without limitation: always stay within the lane, maintain certain minimum distance from any object at all time, a dump truck is not to make more than a 30 degree turn, a loader B is not to climb over a grade more than 15 degrees, etc.

Information about how a particular operation was performed in the past may include, for example, history information indicating how that particular autonomous vehicle performed the operation in the past, how a different autonomous vehicle performed the operation in the past, how the operation was manually performed using a vehicle in the past (e.g., how a driver/operator performed the operation in the past with the vehicle operating under the driver/operator's control). For example, the autonomous vehicle traveled a path in the past, how a manual truck would have driven this path or completed a certain task, and the like.

Based upon the one or more inputs, planning subsystem 206 generates a plan of action for autonomous vehicle 120. Planning subsystem 206 may update the plan on a periodic basis as the environment of autonomous vehicle 120 changes, as the goals to be performed by autonomous vehicle 120 change, or in general, responsive to changes in any of the inputs to planning subsystem 206.

As part of generating and updating the plan of action, planning subsystem 206 makes various decisions regarding which actions to include in the plan in order to achieve a particular goal in a safe manner. Processing performed by planning subsystem 206 as part of making these decisions may include behavior planning, global planning, path planning, fail-safe path, path history tracking, etc.

Planning subsystem 206 may use various AI-based machine-learning algorithms to generate and update the plan of action in order to achieve the goal of performing a function or operation (e.g., autonomous driving or navigation, digging of an area) to be performed by autonomous vehicle 120 in a safe manner. For example, in certain embodiments, planning subsystem 206 may use a model trained using reinforcement learning (RL) for generating and updating the plan of action. Reinforcement learning (RL) is an area of machine learning inspired by behaviorist psychology, concerned with how agents ought to take actions in an environment so as to maximize some notion of cumulative reward. Autonomous vehicle management system 122 may use an RL model to select actions to be performed for controlling an autonomous operation of autonomous vehicle 120. The RL model may be periodically updated to increase its coverage and accuracy.

In certain embodiments, in addition to generating a plan of action, planning subsystem 206 is capable of dynamically controlling the behavior of sensors 110. For example, planning subsystem 206 can send instructions or commands to a particular sensor from sensors 110 to dynamically control the sensor data that is captured by the particular sensor and/or control the sensor data that is communicated from the sensor to perception subsystem 204 (or to other subsystems of autonomous vehicle management system 122, such as to localization subsystem 202). The internal map built by perception subsystem 204 is based upon the sensor data received by perception subsystem 204 from the sensors. Accordingly, being able to dynamically control the sensor data received from the sensors allows planning subsystem 206 to dynamically control the information included in and/or used by perception subsystem 204 to build and maintain the internal map. Planning subsystem 206 can dynamically and on-demand direct sensors 110 to obtain specific types of information or behave in specified manners, for example, to provide additional sensor data to update the consistent internal map. For example, planning subsystem 206 can command a LIDAR sensor to narrow its range of sensing from a three-hundred and sixty-degree (360°) view to a narrower range that includes a specific object to be sensed and/or tracked in greater detail by the LIDAR system. In this way, the consistent internal map can be updated based on feedback from and under the control of planning subsystem 206.

Autonomous vehicle management system 122 provides an infrastructure that enables planning subsystem 206 (or other subsystems of autonomous vehicle management system 122) to send one or more instructions or commands to one or more sensors to control the behavior of those one or more sensors. In the embodiment depicted in FIG. 2A, sensors interface subsystem 210 provides an interface for interacting with sensors 110. In the outbound direction (from autonomous vehicle management system 122 to the sensors direction), planning subsystem 206 can send an instruction or command to sensors interface subsystem 210. Sensors interface subsystem 210 is then configured to communicate the received instruction to the intended destination sensor. In the inbound direction (from a sensor to autonomous vehicle management system 122), sensors interface subsystem 210 may receive sensor data from a sensor in response to the instruction sent from planning subsystem 206. Sensors interface subsystem 210 may then communicate the received sensor data to planning subsystem 206 (or to the appropriate subsystem of autonomous vehicle management system 122 which originated the instruction).

Sensors interface subsystem 210 may be capable of communicating with different sensors using one or more different communication protocols. In certain embodiments, in the outbound direction, for an instruction or command received from planning subsystem 206 (or from any other subsystem of autonomous vehicle management system 122) to be sent to a particular sensor, sensors interface subsystem 210 may translate the instruction to a format that is understandable by and appropriate for communicating with that particular sensor and then use a particular communication protocol that is applicable for that particular sensor.

In certain embodiments, autonomous vehicle management system 122 may have access to information identifying sensors 110 and their capabilities. The subsystems of autonomous vehicle management system 122 may then access and use this stored information to determine the capabilities and behaviors of a sensor and to send instructions to that sensor to change its behavior. In certain embodiments, a sensor has to be registered with autonomous vehicle management system 122 before communication is enabled between the sensor and autonomous vehicle management system 122. As part of the registration process, information related to the sensor being registered may be provided. This information may include information identifying the sensor, the sensor's sensing capabilities and behaviors, communication protocol(s) usable by the sensor, and other information related to the sensor. Autonomous vehicle management system 122 may then use this information to communicate with and control the behavior of the sensor.

As indicated above, planning subsystem 206 may send instructions to a sensor to control and change the sensor's behavior. Changes in a sensor's behavior can include changing the sensor data that is communicated from the sensor to autonomous vehicle management system 122 (e.g. the sensor data communicated from the sensor to perception subsystem 204, or other subsystems of autonomous vehicle management system 122), changing the data that is collected or sensed by the sensor, or combinations thereof. For example, changing the sensor data that is communicated from the sensor to autonomous vehicle management system 122 can include communicating more or less data than what was communicated from the sensor to autonomous vehicle management system 122 prior to receiving the instruction, and/or changing the type of sensor data that is communicated from the sensor to autonomous vehicle management system 122. In some instances, the data sensed or collected by the sensor may remain the same but the sensor data communicated from the sensor to autonomous vehicle management system 122 may change. In other instances, the data sensed or collected by the sensor may itself be changed in response to an instruction received from autonomous vehicle management system 122. Planning subsystem 206 may also be able to turn a sensor on or off by sending appropriate instructions to the sensor.

For example, planning subsystem 206 may receive inputs including a current internal map generated by perception subsystem 204, position information from localization subsystem 202, and a goal that autonomous vehicle 120 is to make a turn in a certain amount of time (e.g., a right turn in the next 5 seconds). As part of deciding what is the best set of actions to be taken by autonomous vehicle 120 to achieve the goal in a safe manner, planning subsystem 206 may determine that it needs particular sensor data (e.g., additional images) showing the environment on the right side of autonomous vehicle 120. Planning subsystem 206 may then identify one or more sensors (e.g., cameras) that are capable of providing the particular sensor data (e.g., images of the environment on the right side of autonomous vehicle 120). Planning subsystem 206 may then send instructions to these one or more sensors to cause them to change their behavior such that the one or more sensors capture and communicate the particular sensor data to autonomous vehicle management system 122 (e.g., to perception subsystem 204). Perception subsystem 204 may use this specific sensor data to update the internal map. The updated internal map may then be used by planning subsystem 206 to make decisions regarding the appropriate actions to be included in the plan of action for autonomous vehicle 120. After the right turn has been successfully made by autonomous vehicle 120, planning subsystem 206 may send another instruction instructing the same camera(s) to go back to communicating a different, possibly reduced, level of sensor data to autonomous vehicle management system 122. In this manner, the sensor data that is used to build the internal map can be dynamically changed.

Examples of changes in a sensor's behavior caused by an instruction received by the sensor from autonomous vehicle management system 122 may include, without limitation:

Cause a sensor to reduce, or even shut off, sensor data that is communicated from the sensor to autonomous vehicle management system 122. This may be done, for example, to reduce the volume of sensor data received by autonomous vehicle management system 122. Using the same example from above, where planning subsystem 206 receives an input indicating that a goal of the autonomous vehicle 120 is to make a right turn, planning subsystem 206 may decide that it requires reduced sensor data with respect to the left environment of autonomous vehicle 120. Planning subsystem 206 may then identify one or more sensors (e.g., cameras) that are responsible for communicating the sensor data that is to be reduced. Planning subsystem 206 may then send instructions to these one or more sensors to cause them to change their behavior such that the amount of sensor data communicated from these sensors to autonomous vehicle management system 122 (e.g., to perception subsystem 204) is reduced.

Cause a sensor to change its field of view. For example, causing a camera or a LIDAR sensor to zoom in to a narrow location or to reorient to a particular pose.

Cause a sensor to only send partial information. For example, the sensor may send less than all the information captured by the sensor.

Cause a sensor to send information faster or slower than before or than a regular rate.

Cause a sensor to turn on.

Cause a sensor to capture and/or send information to autonomous vehicle management system 122 at a different resolution or granularity then before.

Figure 2B:
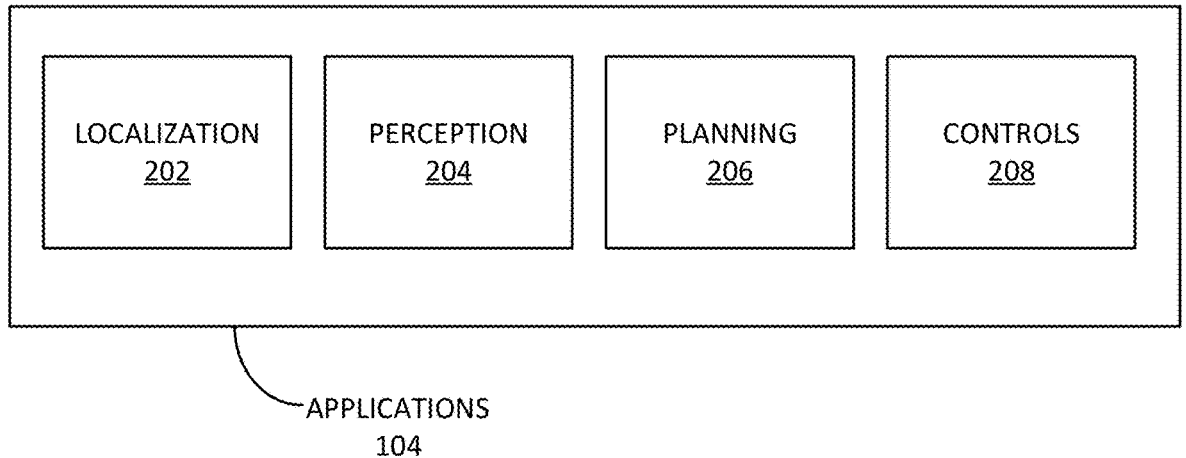
FIG. 2B illustrates software modules that may be used to implement the various subsystems of an autonomous vehicle management system according to certain embodiments.

FIG. 2B illustrates software modules (e.g., program, code, or instructions executable by one or more processors of autonomous vehicle 120) that may be used to implement the various subsystems of autonomous vehicle management system 122 according to certain embodiments. The software modules may be stored on a non-transitory computer medium. As needed, one or more of the modules or executable images of the modules may be loaded into system memory (e.g., RAM) and executed by one or more processors of autonomous vehicle 120. In the example depicted in FIG. 2B, software modules are shown for implementing localization subsystem 202, perception subsystem 204, planning subsystem 206, and controls subsystem 208.

Figure 4:
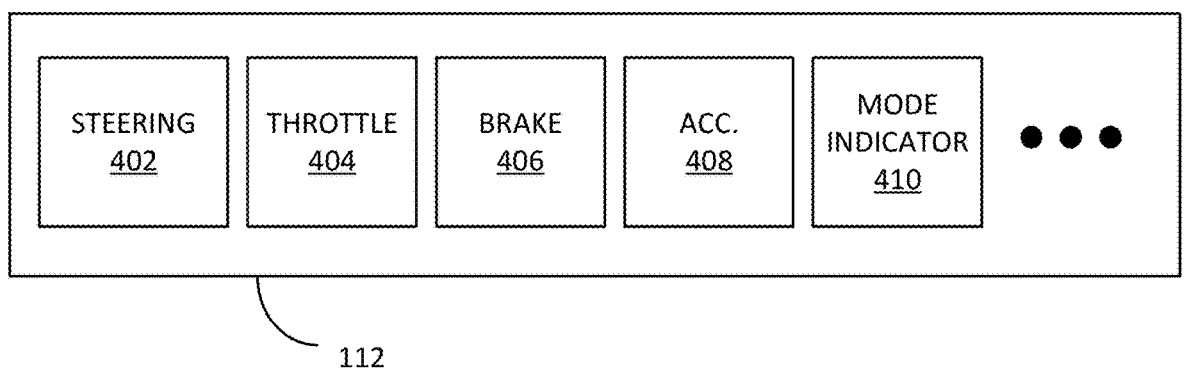
FIG. 4 illustrates an example set of vehicle systems that may be provided by the vehicle, according to some embodiments.

FIG. 4 illustrates an example set of vehicle systems 112 that may be provided by the vehicle, according to some embodiments. Vehicle system 112 can include for example: steering 402, throttle 404, brake 406, accessories 408, mode indicator 410, etc. In some embodiments, steering 402, throttle 4404, and brake 406 can be operated autonomously by controls subsystem 208 to control the path and speed of the vehicle during locomotion. Accessories 408 can include controls to operate mechanical accessories of the vehicle, such as a scoop, lifter, scraper, or any other articulating member that can be operated autonomously Mode indicator 410 can provide current vehicle mode information (e.g., speed, forward/reverse, etc.) to AVMS 122, to other components of an autonomous vehicle, to a remote operator or the like.

Figure 5:
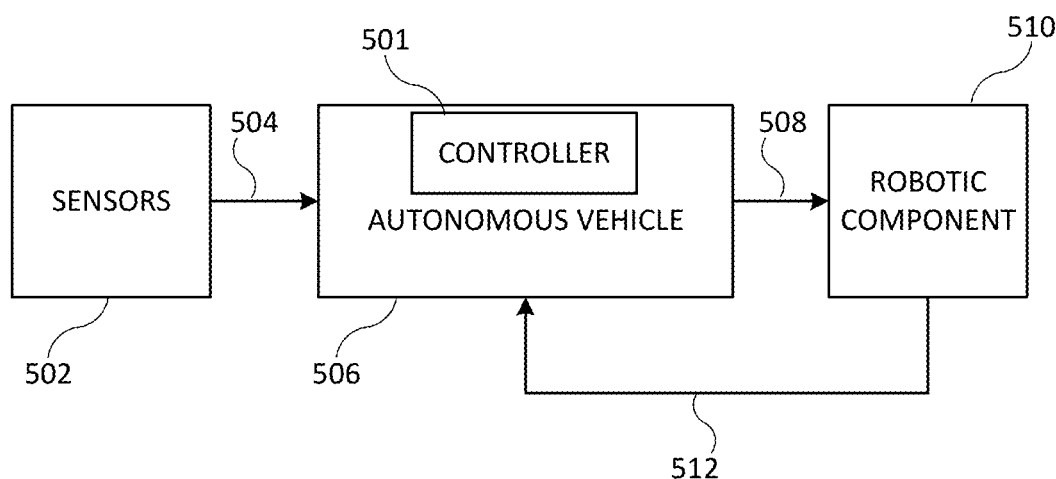
FIG. 5 is a simplified block diagram illustrating an architecture of an autonomous vehicle and its environment according to one or more embodiments.

FIG. 5 is a simplified block diagram illustrating an architecture of an autonomous vehicle and its environment according to one or more embodiments. In some embodiments, autonomous vehicle 506 may comprise hardware and software for performing tasks. For example, autonomous vehicle 506 may comprise a set of one or more processors configured to execute program code or other instructions. These instructions may be stored on a non-transitory computer medium (e.g., system memory, non-volatile memory, etc.). In some embodiments, autonomous vehicle 506 may implement a software stack (e.g., a fully autonomous equipment software stack depicted in FIG. 1B) and equipment systems (e.g., vehicle systems as illustrated in FIGS. 1A-1B), as well as further components. In the embodiment depicted in FIG. 5, autonomous vehicle 506 comprises a controller 501 that can receive an input 504 from at least one sensor 502. Sensor 502 may include sensors that are positioned on or in equipment 506 and/or sensors that are external to equipment 506, such as cameras, LIDAR or the like.

Input 504 to controller 501 of autonomous vehicle 506 can be raw sensor data or processed sensor data that is used by autonomous vehicle 506 to perform one or more tasks. Input data received via input 504 can also include, for example, identification of the area in which the task is to be initialized, performed, and/or completed. Input data can also include detection, identification and/or classification of at least one object in the environment or within the area in which the task is to be performed. Such data can be helpful when a task is to be performed autonomously. Sensor data 502 can also include, for example, data obtained from cameras, LIDAR point cloud data, pressure sensors, terrain sensors, kinematic data, and/or other sensor-acquired data.

On receiving input 504, controller 501 can sense, plan and generate an output 508 to control or command a robotic component 510 of the equipment to perform a task autonomously. Examples of robotic components include components related to locomotion (i.e., moving the entire autonomous vehicle) such as throttle, brake, steering, or the like, as well as articulating components mounted to the autonomous vehicle that can manipulate objects in the environment, such as a scoop, claw or other gripper, plow blade, or the like.

Output 508 can comprise one or more commands, such as commands for controlling the movement of the robotic part 510 forward, backward, left, right, center, upwards, downwards, rotationally, etc. Furthermore, output 508 can also comprise certain other control parameters, or command controls to actuators or other sub-components of robotic component 510.

Further, a feedback input stream 512 to controller 501 is also provided for subsequently performing additional cycles to complete the task. The feedback can include status information from robotic component 510 (e.g., current speed or positioning information, indications when a limit of a range of travel has been reached, and so on).

Figure 6:
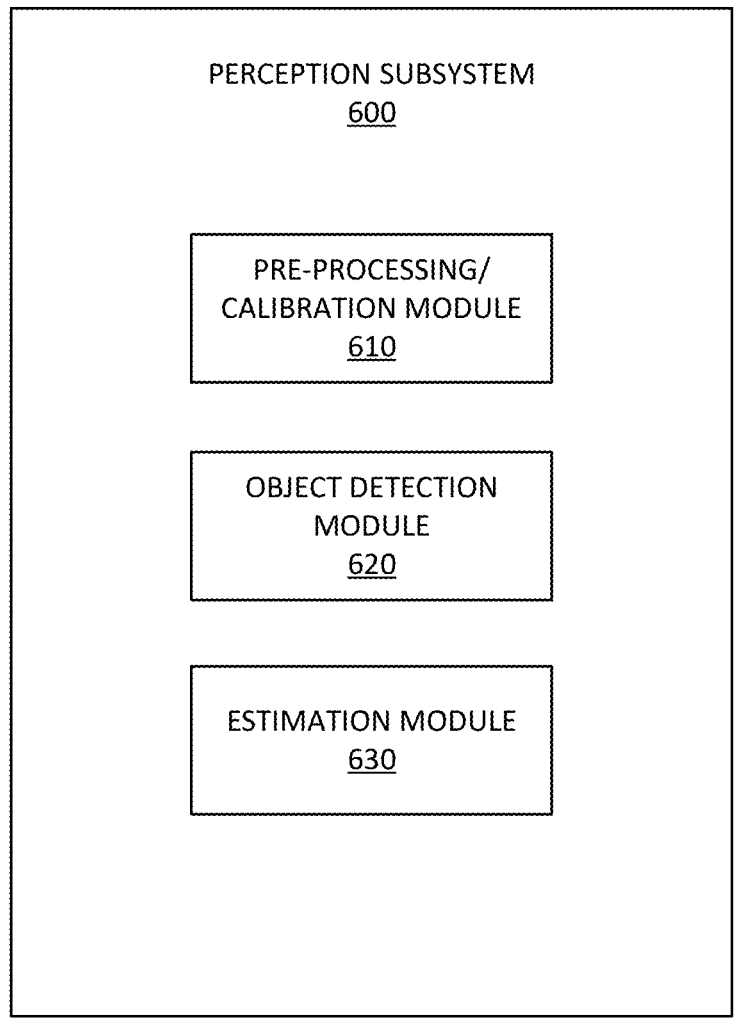
FIG. 6 is a simplified block diagram of a perception subsystem in an autonomous machine (e.g., autonomous vehicle) according to some embodiments.

In some embodiments, sensor data input 504 can be processed using a perception subsystem in order to enable identification and analysis of objects in the environment. FIG. 6 is a simplified block diagram of a perception subsystem 600 in an autonomous machine (e.g., autonomous vehicle 120) according to some embodiments. Perception subsystem 600 can be used to implement perception subsystem 204 in FIG. 2A. As depicted in FIG. 6, perception subsystem 600 may include a pre-processing module 610, an object detection module 620, and an estimation module 630. Each of the modules 610, 620, and 630 can be implemented in software only, hardware only, or combinations thereof. The perception subsystem 600 depicted in FIG. 6 is merely an example. One of ordinary skill in the art would recognize many possible variations, alternatives, and modifications. For example, in some implementations, perception subsystem 600 may have more or fewer subsystems or components than those shown in FIG. 6, may combine two or more subsystems, or may have a different configuration or arrangement of subsystems.

Pre-processing module 610 is configured to condition and/or reformat obtained sensor data in preparation for further processing by the object detection module 620. Formatting may involve transforming data produced by one sensor and data produced by a second sensor into a shared format and/or shared frame of reference. For example, sensors may capture data at different rates (e.g., two cameras capturing data at different frames per second, or a radar sensor operating at a different frequency than a LIDAR sensor). Thus, as part of the processing performed by pre-processing module 610, data captured from sensors operating at different rates may be reformatted so as to enable the sensor data to subsequently be combined in a coherent manner, e.g., merging or grouping together of data captured by different sensors but corresponding to the same time period. As another example, sensors may be located at different places (e.g., different locations on a body of the autonomous vehicle) and/or oriented differently (e.g., two cameras pointed in slightly different directions for generating stereoscopic images). If a first sensor captures an object in a particular position and a second sensor captures the same object in different position (e.g., due a difference in the perspective of the second sensor relative to the first sensor), pre-processing module 610 may perform a geometric correction to ensure that the object is represented in the sensor data from both sensors as a single object and not two separate objects.

Conditioning of sensor data may involve any number of operations that improve the quality of the sensor data. The conditioning may vary depending on the type of sensor. For example, camera pre-processing may involve image size or resolution adjustments (e.g., to scale down a large image to a smaller size for faster downstream processing) and corrective image processing (e.g., lens correction, aberration correction, white balancing, aperture correction, and the like). Camera pre-processing may also involve combining different images into a single image (e.g., as an average of a set of images). Other types of conditioning operations include operations to eliminate noise or unneeded information (e.g., cropping of images, eliminating LIDAR data captured outside of a certain field of view, removing data corresponding to objects or regions that are not of interest (e.g., the ground), etc.).

Pre-processing module 610 may also be configured to perform calibration of sensors to change the sensor behavior and/or to compensate for non-ideal sensor behavior. Examples of changing the behavior of a LIDAR or radar sensor include adjusting a reflectivity parameter to change the operating range of the LIDAR/radar sensor (e.g., to prevent capturing of data beyond a certain distance when an object of interest, such as pile, is known to be less than that distance away from the vehicle) and changing the field of view captured by the LIDAR/radar sensor (e.g., from 360 degrees to 270 degrees). An example of a corrective camera calibration is the estimation of parameters for a lens and/or image sensor in a camera to enable the estimated parameters to be used to correct for lens distortion during subsequent image capture. Thus, pre-processing can involve operations performed prior to capturing sensor data as well as post-capture operations. Calibration can include intrinsic calibrations (e.g., adjusting the behavior of a sensor based on data captured by the same sensor) and/or extrinsic calibrations (e.g., adjusting the behavior of a sensor based on data from another sensor).

In certain embodiments, calibration of a camera involves calculating an extrinsic matrix for the camera. The extrinsic matrix represents the camera's pose and is a transformation matrix comprising values indicating a geometric transformation (e.g., translation and/or rotation) needed to map the camera's frame of reference to some other frame of reference (e.g., the reference frame of a LIDAR sensor). The extrinsic matrix can be calculated as a 3×4 matrix using a checkerboard calibration technique, in which a 3D calibration rig featuring a checkerboard pattern is placed within view of the camera and then captured to determine matrix parameters that map a point or feature in the checkerboard image to a corresponding point or feature in the other frame of reference. For example, a corner of the calibration rig as represented in the checkerboard image can be mapped to a corner of the calibration rig as represented in a point cloud generated by a LIDAR sensor. The calculation of the extrinsic matrix can be performed as a one-time setup involving the use of a perspective-n-point (PnP) algorithm that estimates the camera pose given a set of n number of 3D points and their corresponding two-dimensional (2D) projections in a camera image. Once calculated, the extrinsic matrix can be used to combine data from a camera with data from another sensor, for example, to merge 2D camera images with 3D data from other sensors (e.g., LIDAR point clouds) or to merge 2D camera images from two different cameras to form a depth image based on a disparity between the camera images.

Object detection module 620 is configured to receive the pre-processed sensor data from pre-processing module 610 and to determine which portions of the sensor data correspond to a particular class (or multiple classes) of object. Object detection module 620 may partition sensor data into segments, where each segment is represented by an enclosed 2D or 3D boundary. For example, segmenting a 2D image captured by a camera may involve generating a border around a group of pixels based on determining that the pixels belong to the same object. Segmentation is typically performed concurrently with classification (determining the class of each segment). The process of dividing an input representation into segments of one or more classes is sometimes referred to as semantic segmentation. Semantic segmentation can be viewed as forming a mask by which the input representation is filtered, where the mask comprises shapes that are labeled according to the type of object to which the shape corresponds. LIDAR or radar data (e.g., a 3D point cloud) can also be segmented, for example, by generating a 3D surface (e.g. a geometric mesh) representing the boundaries of an object. Segmentation can be performed algorithmically (e.g., using a software algorithm that performs geometric calculations to generate a surface of polygons as a geometric mesh) or using a machine learning (ML) model trained to infer the boundaries of an object from sensor data.

Object detection does not necessarily involve identifying every object captured in the sensor data. Instead, objection detection module 620 can be configured to detect only objects of interest, such as piles of material, other vehicles, human beings, road markings, barriers, terrain, or the like. In certain embodiments, detection of objects of interest can be performed by an artificial intelligence (AI) or machine learning (ML) model, for example, a convolutional neural network (CNN) that has been trained to detect objects that have particular shapes or features or other deep neural network (DNN) that has been trained to distinguish and label different types of objects. The object detection module 620 can combine detection techniques, with different detection techniques being applied depending on the source of sensor data.

When performing segmentation, object detection module 620 may classify segments according to a set of predefined categories or classes of objects. The types of classes recognized by object detection module 620 may vary depending on the environment in which the autonomous machine is deployed. For instance, an object detection module designed for mining equipment may be trained or otherwise configured to recognize segments that correspond to a pile of dirt, terrain (e.g., soil or grass), the sky, humans, mining vehicles, traffic cones, and the like.

Object detection module 620 generates one or more representations of a physical environment and/or an object of interest using sensor data received from the pre-processing module 610. For instance, object detection module 620 may generate a segmented 2D image as a substitute for a 2D camera image, where the pixels of the original 2D image are replaced with pixels corresponding to shapes defined by the borders identified during segmentation processing. The color values of the pixels in the segmented image may be set according to the class of the object. In this manner, the original image can be simplified by removing extraneous visual information while making it easier to distinguish objects of different classes. In some embodiments, the color of the pixels in a segment may be kept substantially the same as in the original image, except that an outline is drawn around the border of the segment. The replacement image may be augmented with labels describing the objects (e.g., text or metadata describing the class of object). As another example, the object detection module 620 may generate a voxel representation of an object using a LIDAR point cloud (e.g., a 3D stack of cubes approximating the shape of the object as indicated by the points in the point cloud).

Estimation module 630 is configured to receive disparate representations from the object detection module 620 and to combine the disparate representations into a single representation for analysis by estimation module 630 and/or as an output for downstream processing. For example, estimation module 630 may generate a 3D representation of a particular object from a segmented image and a voxel representation, where the 3D representation represents the geometry of the object more accurately than either the segmented image or the voxel representation alone. In certain embodiments, the 3D representation generated by estimation module 630 is a smoothed voxel representation or a digital elevation model (DEM) representing the surface of an object of interest. The 3D representation may comprise a grid of boxes and, for each box within the grid, information indicating the height of the box (e.g., the total number of voxels occupied between a ground surface and the top of the object at a particular location along the object's surface). In certain embodiments, the 3D representation generated by estimation module 630 is used to update the internal map described earlier, in connection with the embodiment of FIG. 2A, as containing information about objects in the ego vehicle's environment as well as information about the state of the ego vehicle.

Estimation module 630 may use the 3D representation to estimate one or more characteristics of an object of interest, such as the height, volume, or material composition of the object. Such estimates may be quantitative or qualitative depending on the characteristic. In various embodiments, these characteristics may facilitate the performing of various tasks by an autonomous machine. For instance, size of an object may be used to determine whether the object can be lifted or moved. In certain embodiments, estimation module 630 may be configured to communicate the estimated characteristics and/or 3D representation to another autonomous machine (e.g., to the perception subsystem of another autonomous vehicle nearby) to enable the other autonomous machine to perform one or more tasks based on such information.

In certain embodiments, object detection module 620 and estimation module 630 may be implemented on a high-speed computing platform for processing sensor data efficiently at a high throughput. For example, the sensors and the various computing resources (processors, memory, etc.) that form the object detection module 620 and the estimation module 630 may be coupled by one or more high-speed communication networks (e.g., Gigabit Ethernet) and may perform processing in a pipelined fashion so that sensor data is collected and processed in real-time.

In certain embodiments, the object detection module 620 includes one or more machine learning models. Each ML model in the object detection module 620 receives preprocessed sensor data as input. An ML model can receive one or more types of sensor data. For example, separate ML models can be provided for camera data and LIDAR data, or a single ML model can receive camera, LIDAR, and radar data. The sensor data received by an ML model comprises a 2D or 3D representation of a physical environment as captured by a sensor. For example, the sensor data may comprise a 2D image generated by a camera and/or a 3D point cloud generated by a LIDAR sensor. An ML model can be trained to generate inferences based on the sensor data. For instance, an ML model may infer, from the color values of each pixel in a 2D image, which regions of the image correspond to a pile or other object of interest. The ML model may output the inferences in the form of an additional 2D or 3D representation, of the object alone or the object within the environment. For example, in certain embodiments, an ML model is trained to infer the boundaries of different classes of objects based on color information from a camera image, and to output a segmented image indicating the boundaries of each object detected by the ML model. Training generally involves providing a set of training representations as input to the ML model, comparing the resulting inferences to ground truth information corresponding to correct inferences, and adjusting the behavior of the ML model based on the difference between the actual inferences and the correct inferences.

According to some embodiments, autonomous vehicle systems of the kind described above can be operated according to techniques described below to efficiently move materials in the environment that may be haphazardly or chaotically arranged.

Reinforcement Learning Overview

Figure 7:
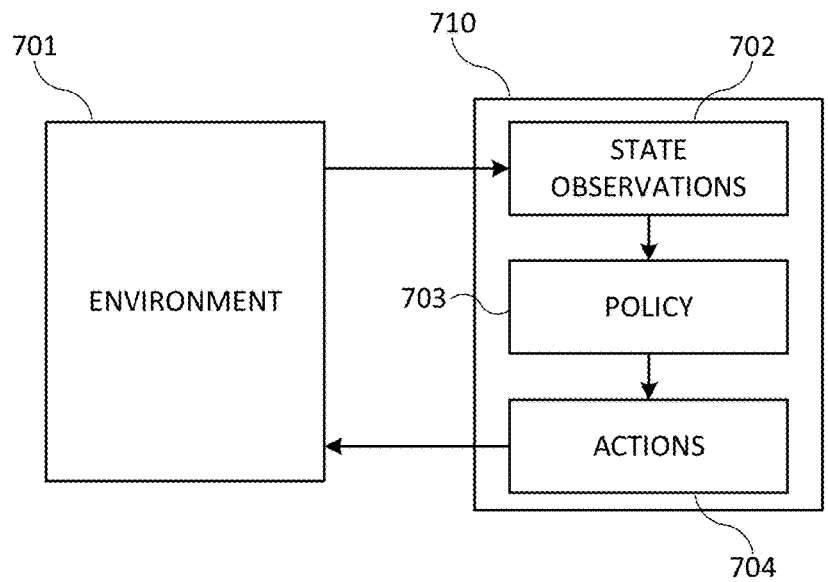
FIGS. 7 and 8 illustrate an overall architecture for training an RL agent according to some embodiments.
Figure 8:
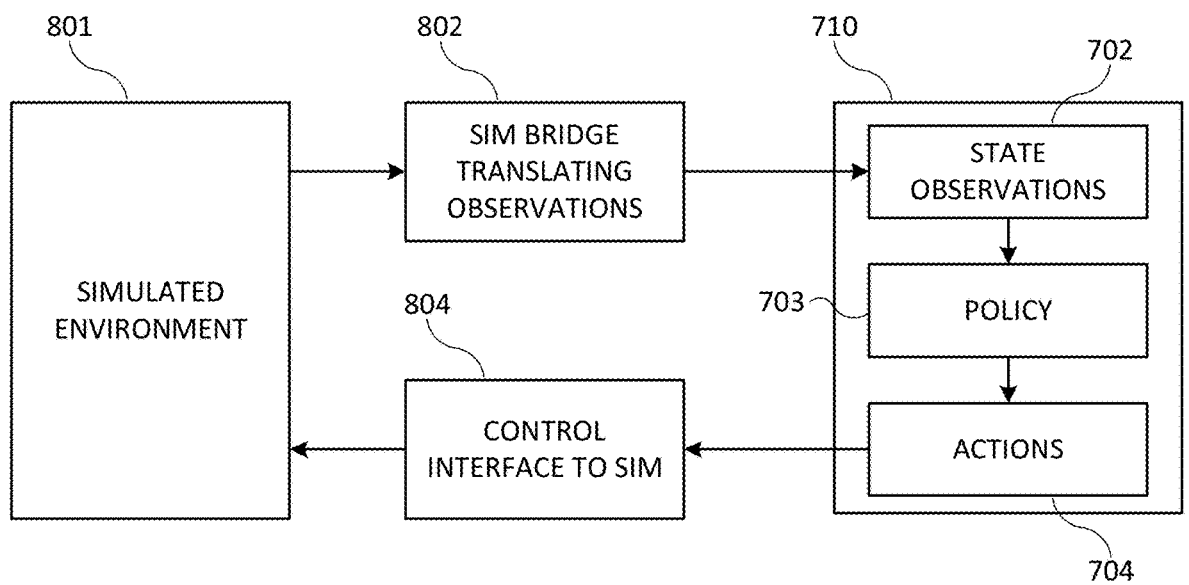

In some embodiments, controller 501 (or other controller of an autonomous vehicle or machine) can implement a reinforcement learning (RL) agent that has been trained using RL techniques to direct functions of autonomous vehicle systems 112, including drive functions and/or robotic parts. FIGS. 7 and 8 illustrate an overall architecture for training an RL agent 710 according to some embodiments. As shown in FIG. 7, environment 701 represents a real-world environment with which the autonomous equipment (directed by RL agent 710) interacts, e.g., by moving within the environment, grasping or lifting objects in the environment, etc. Environment 701 changes as and when RL agent 710 interacts with it. State observations 702 imply states and observations, wherein state is a complete description of the state of the world and an observation is a partial description of a state. State observations 702 can include sensor data from any or all sensors mounted on the autonomous vehicle, as well as sensor data from sensors positioned elsewhere in the environment and communicably coupled to the autonomous vehicle. State observations 702 can incorporate sensor data in raw form. Additionally or instead, sensor data can be pre-processed to generate state observations 702. For instance, perception subsystem 600 described above can pre-process image data to identify objects or features of interest, and the output of perception subsystem 600 can be provided as state observations 702. State observations 702 can be represented by a real-valued vector, matrix, or higher-order tensor. Policy 703 represents decision criteria for selecting an action 704 by an RL agent based on the current state observations 702, in such a manner as to maximize a reward function. An example of the above architecture is as follows. An RL agent interacts with its environment at certain times. The RL agent receives an observation which includes a policy, such as a reward policy. Based on this input, the RL agent chooses an action in the environment. As a result of the action, the environment changes to a different state, and the next policy is determined. Training involves procedures to determine the optimal policy for a given state to maximize the reward function.

In practice, training an RL agent using real equipment in a real environment can be slow and expensive. Accordingly, in some embodiments simulations can be used to speed up training. As shown in FIG. 8, real environment 701 can be replaced with a simulated environment 801, a simulation bridge 802 that translates the state of simulated environment 801 to sensor inputs that contribute to state observations 702, and a control interface 804 that translates actions 704 to simulated actions to be performed in the simulated environment 801. Thus, training outcomes using simulated environment 801 of FIG. 8 can be directly applied to real environment 701 of FIG. 7. This can allow training to proceed orders of magnitude faster, because the simulation can model the effects of an action much faster than real-time performance of the action.

The simulator (which provides simulated environment 801) and real physical environment 701 can use the same kinematics and image data. In the case of simulation, the simulator can create image data that passes through the same image segmentation modules that process real image data. The simulated environment can be built to provide a large range and/or degree of variability for various parameters in order to offer a range of learning sets and instances.

The simulation can also speed up training episodes, e.g., by a factor of 100 to 300, as compared to real-world operation of a machine. The amount of training needed can be decided based on the sample efficiency of the model, for example using proximal policy optimization based methods. In some embodiments a non-parametric probabilistic Gaussian processes (GP) based model is used to reduce the sample efficiency, since it is very expensive to refine the model on the actual device.

Model uncertainty is another consideration, since the model of the environment might not match a particular real-world environment. In some embodiments, this can be addressed using domain randomization methods. GP is a probabilistic, non-parametric model and can be interpreted as a distribution over functions. A further improvement can be performed using Meta reinforcement learning where the sample efficiency is very high. Also, the simulated environment need not completely match a real world environment, provided that it supports domain randomizations wherein certain elements and properties relevant to the task or agent, or parameters of the environment itself, can be randomized. This allows the RL agent to learn a number of options and to navigate through a number of variables to perform a task. This also allows the RL agent to deal with unknown variables, parameters and/or dynamics in the real world.

In some embodiments, the algorithms used for training can be further advanced as compared to conventional RL or machine learning algorithms, which can only handle a small amount of variation in its environment's parameters, variables or elements. Domain randomizing is advantageous for machines that are used in harsh or highly variable environments (such as industrial work sites) where the actuator response and sensor behavior may be subject to change. In addition, as described above, RL models for visual servo control can be created and trained without requiring knowledge of the dynamics (e.g., actuator response) of a particular machine, allowing the models to be deployed across a fleet of vehicles.

Task Example: Moving a Pile of Material

Figure 9A:
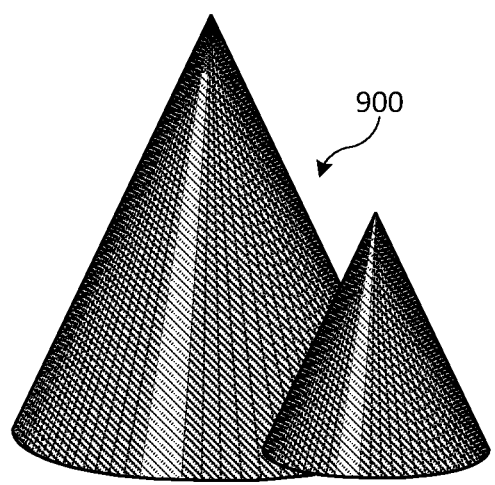
FIGS. 9A and 9B show a side view and a top view of an idealized pile of dirt.
Figure 9B:
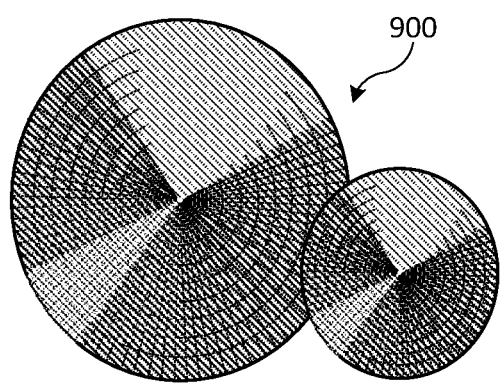

According to some embodiments, an autonomous vehicle of the kind described above can be trained to perform an iterative material-moving task on materials that may be haphazardly or chaotically arranged. For example, FIGS. 9A (side view) and 9B (top view) show two views of an idealized pile of dirt 900. (It is noted that real-world dirt piles generally are not expected to have precisely conical shapes; however, the general property of being wider at the base and tapering toward the top is expected.) It may be desirable to remove the dirt from dirt pile 900 to a different location (e.g., into the bed of a dump truck or to any other destination location).

Figure 10:
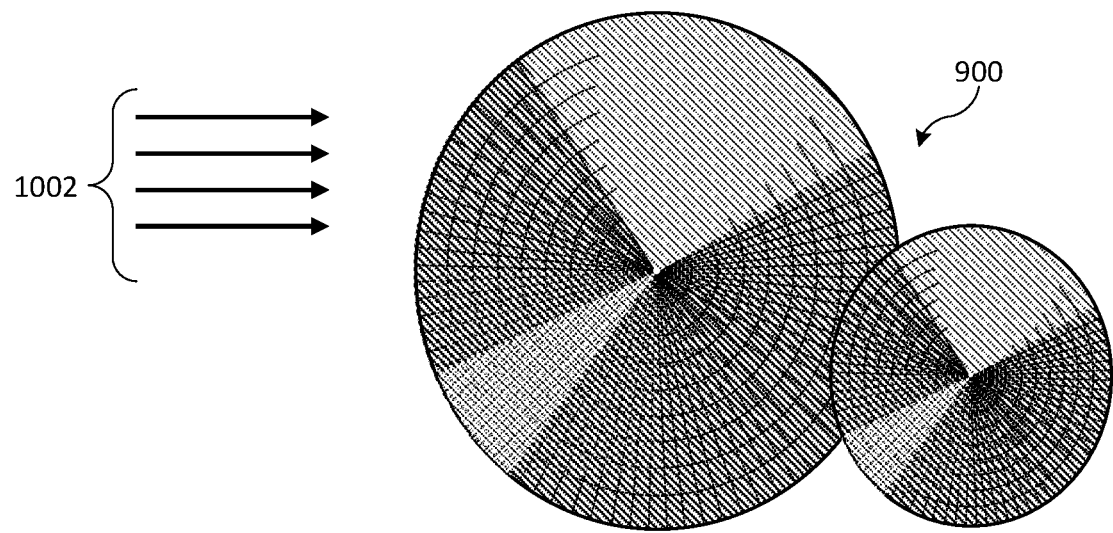
FIG. 10 shows a top view of a dirt pile illustrating an approach to dirt removal used in a conventional autonomous vehicle.

Existing machines can be programmed to execute the task by repeatedly approaching the dirt pile from a particular direction and performing a scooping operation. This tactic is illustrated in FIG. 10, which shows another top view of dirt pile 900 with arrows 1002 indicating the direction of approach for each iteration of the scooping operation. However, a pile of dirt is generally understood as chaotic in nature (i.e., deterministic, but highly sensitive to initial conditions). As each portion of dirt is scooped, some of the remaining dirt may fall into the area that was scooped, or the entire pile may become destabilized and shift position. Thus, the tactic illustrated in FIG. 10 may require a very large number of repetitions to complete the task of removing all of the dirt.

Figure 11:
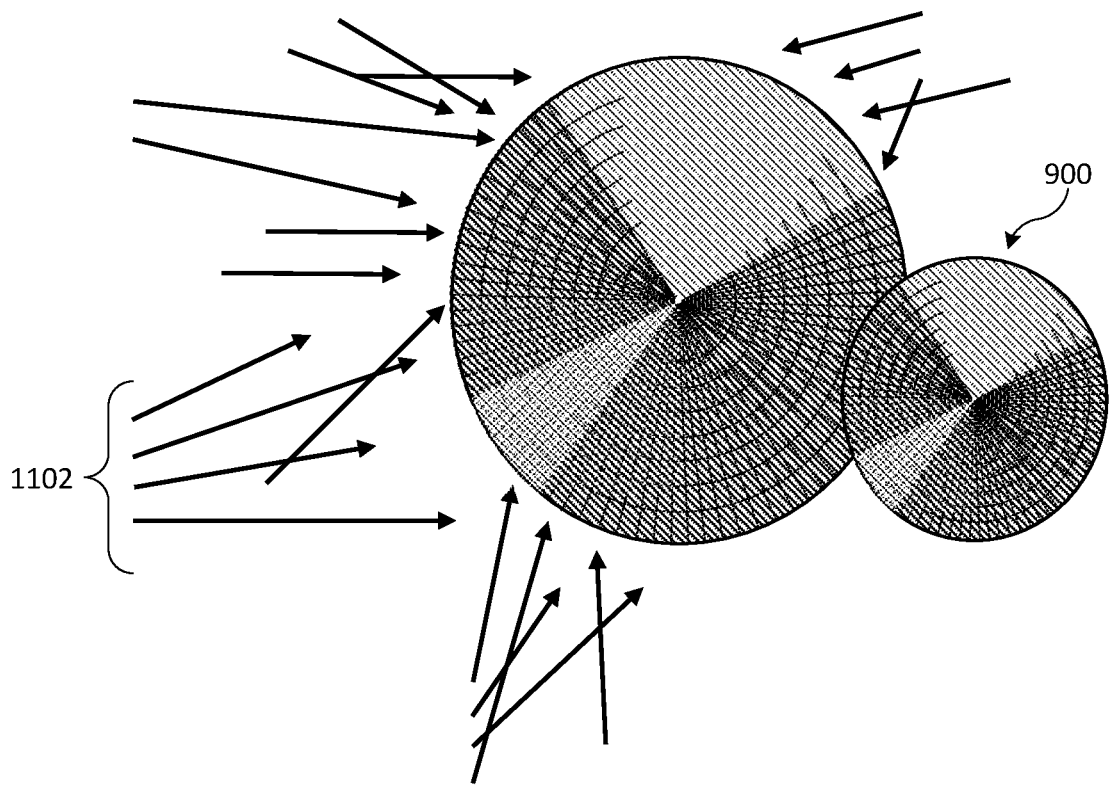
FIG. 11 shows a top view of a dirt pile illustrating an approach to dirt removal that might be used by a human operator of a vehicle.

In contrast, FIG. 11 illustrates a tactic that might be used by a human operator tasked with moving dirt pile 900. As indicated by arrows 1102, the operator may approach dirt pile 900 from a slightly or very different direction for different iterations of the scooping operation. In general, the operator is not able to predict the optimal sequence of operations at the outset (due in part to the chaotic nature of dirt piles), but an experienced operator can mentally assess the dirt pile and intuitively choose an approach vector for the next iteration of scooping that will reduce the total number of iterations needed to complete the task of removing the dirt. Human intuition, however, is not transferable to an automated system.

In some embodiments, machine-learning techniques can be used to enable an autonomous vehicle to perform the task of moving a dirt pile in a manner similar to that shown in FIG. 11. As the autonomous vehicle iteratively removes dirt from the pile (e.g., by operating a scoop), the autonomous vehicle can make a real-time determination of where to perform the next scooping operation based on the current state of the dirt pile. Further, using visual servo techniques, the autonomous vehicle can perform the tasks of navigating to the target position and performing a scooping operation. In some embodiments, these tasks are performed without reference to a machine-specific dynamic model.

Figure 12:
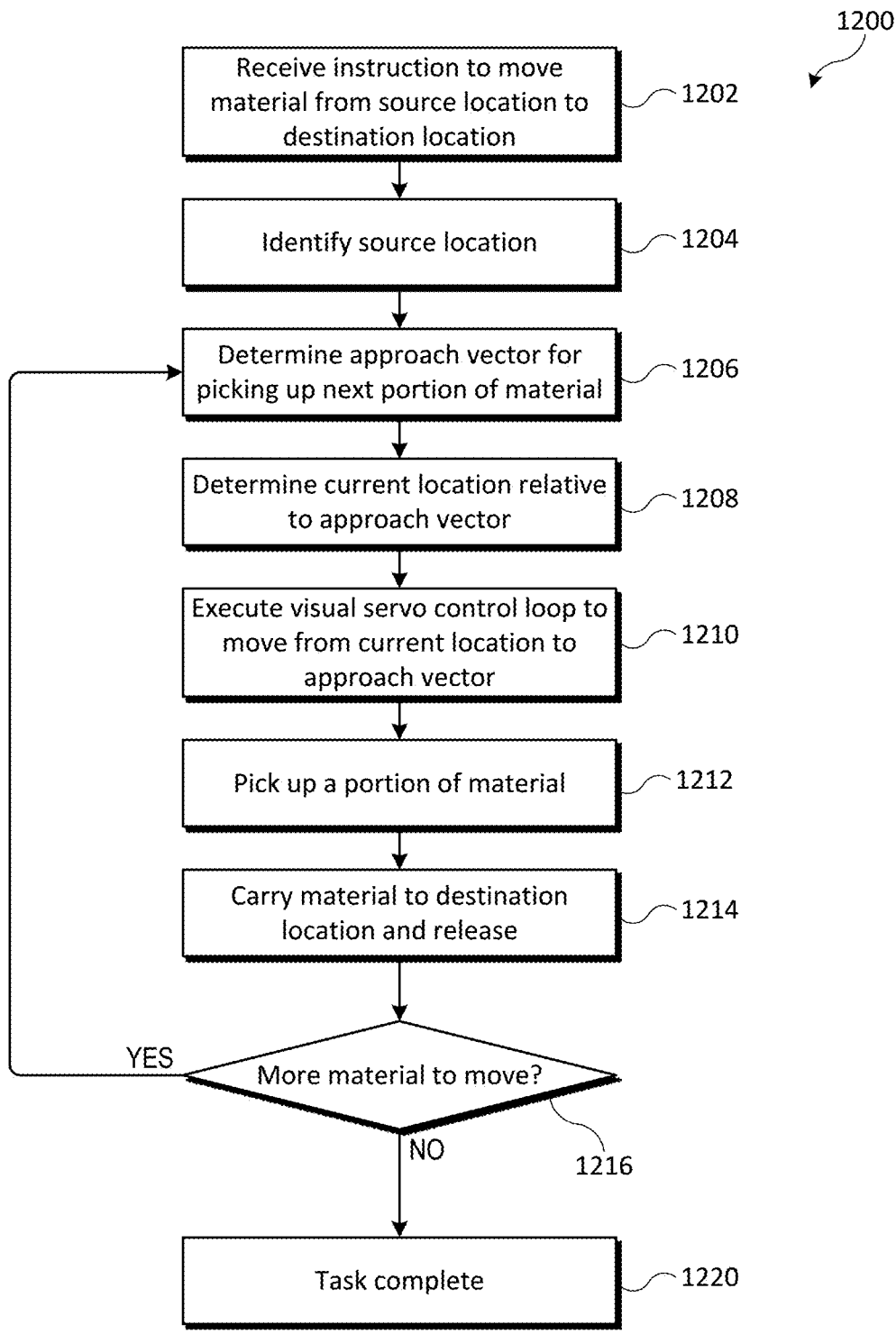
FIG. 12 is a flow diagram of a process for iteratively moving material from a source location to a destination location according to some embodiments.

FIG. 12 is a flow diagram of a process 1200 for iteratively moving material from a pile (or source location) to a destination location according to some embodiments. Process 1200 can be implemented in any of the autonomous vehicle systems described above or in other autonomous vehicle systems.

Process 1200 can begin at block 1202, where the autonomous vehicle receives an instruction to move material (e.g., dirt) from a source location (e.g., a pile) to a destination location. At block 1204, the autonomous vehicle control system can determine the source location. In some embodiments, the source location may be specified in the instructions. In other embodiments, the autonomous vehicle control system can use perception subsystem 600 to automatically identify the source location. For example, techniques for automatically identifying a dirt pile based on sensor data are described in U.S. patent application Ser. No. 16/657,921, filed Oct. 18, 2019, the entire disclosure of which is incorporated herein by reference. At block 1206, the autonomous vehicle control system can determine an approach vector for picking up the next portion of material from the source location. As used herein, the "approach vector" refers to the direction in which the autonomous vehicle (or its scooping member or other object-manipulating member) is pointed immediately prior to initiating a material pickup operation.

Determination of the approach vector can be made by performing a 3D analysis of the material pile as well as considering the surrounding area (e.g., whether some approach directions are blocked by obstacles). In some embodiments, determination of the approach vector can be based solely on the current state of the environment (including the pile), regardless of the approach vector of any previous iterations of the material-moving process. Examples of techniques that can be used to automatically determine an approach vector for a given iteration are described below.

At block 1208, the autonomous vehicle control system can determine its current location, and at block 1210, the autonomous vehicle control system can navigate the vehicle from its current location to match the approach vector. In some embodiments, the navigation can rely on visual servo techniques, examples of which are described below.

At block 1212, having reached the approach vector, the autonomous vehicle control system can operate a scooping member (or other object-manipulating member) to pick up a portion of the material. Depending on the particular machine, the vehicle may operate an articulating member to perform the pickup operation. In some embodiments, operation of the articulating member can also be controlled using visual servo techniques, examples of which are described below.

At block 1214, the autonomous vehicle control system can carry the material to a destination location and release it. In some embodiments, this may involve locomotion (moving the entire vehicle) and/or moving an articulating arm to which the scooping member is mounted. Again, such operations can be controlled using visual servo techniques, examples of which are described below.

At block 1216, the autonomous vehicle control system determines whether more material remains at the source location to be moved. In some embodiments, this determination may include gathering and analyzing sensor data from the area of the source location. In other embodiments, the instruction may have been to move a certain amount of material, and the autonomous vehicle control system can track the amount of material that has been moved in order to determine when the desired amount has been moved.

If more material remains to be moved, process 1200 can return to block 1206 to determine the approach vector to use for the next iteration of moving a portion of material. As noted above, picking up a portion of the material may disturb the position of some or all of the remaining material. Accordingly, the determination at block 1206 can be made independently for each iteration and can take into account the current shape of the material pile, new or removed obstacles in the vicinity of the material pile, and so on. Process 1200 can continue in an iterative manner until the task is complete at block 1220.

Process 1200 is illustrative, and variations and modifications are possible. To the extent logic permits, blocks described sequentially can be performed in parallel, order of operations within or among blocks can be altered, blocks may be omitted, and other operations not specifically described may be performed. Process 1200 or similar processes can be applied to a variety of tasks in which iterative movement of material (including but not limited to dirt) from a source location to a destination location is desired. Process 1200 may be particularly useful in instances where the material at the source location is arranged haphazardly or irregularly (e.g., in a pile) but may be employed in any instance where material is to be moved from a source location to destination location in an iterative manner.

Determination of Approach Vector

Figure 13:
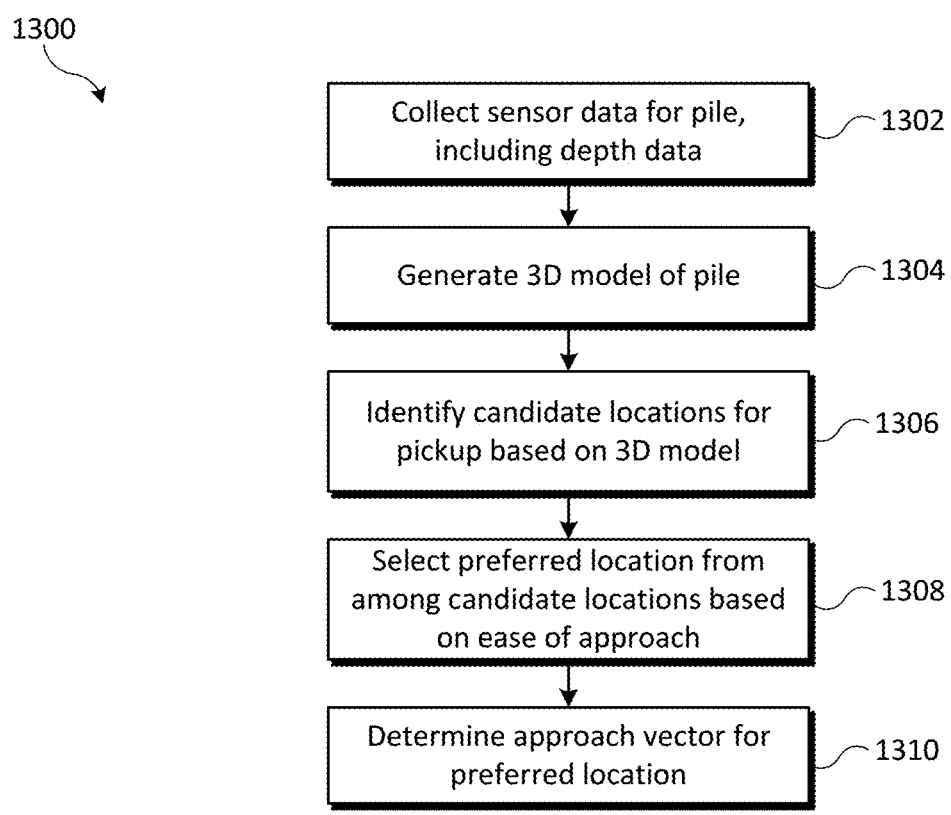
FIG. 13 is a flow diagram of a process for determining an approach vector according to some embodiments.

According to some embodiments, machine learning techniques can be used to facilitate determination of an approach vector, e.g., at block 1206 of process 1200. FIG. 13 is a flow diagram of a process 1300 for determining an approach vector according to some embodiments. Process 1300 can be implemented, e.g., in perception subsystem 600 of FIG. 6 for an autonomous vehicle. Process 1300 can begin when a pile of material has been identified (e.g., as described above).

At block 1302, process 1300 can collect sensor data for a pile of material, including depth data. For example, the sensor data can include camera data for a 2D field of view plus LIDAR data that is spatially registered with the camera data that provides depth information. As another example, the sensor data can include stereoscopic camera data from two (or more) cameras set a known distance apart and arranged to image overlapping fields of view. By analyzing the images, registration can be established between a feature in one image and a feature in the other image, and the offset in position of that feature between the two images can be used to determine depth for that feature. Numerous examples of techniques for extracting depth information for features of an image are known in the art, and further description is omitted.

At block 1304, process 1300 can generate a 3D model of the pile based on the sensor data. The 3D model can be, for instance, a mesh model or a voxel model where the voxels can have varying size to represent the contours of the pile. Examples of techniques for generating a 3D model of a dirt pile that can be used at block 1304 are described in U.S. patent application Ser. No. 16/657,921, filed Oct. 18, 2019, the disclosure of which is incorporated by reference herein. Other techniques can also be used.

At block 1306, process 1300 can identify one or more candidate locations for the next pickup operation based on the 3D model. In some embodiments, candidate locations are based on density of vertices in a mesh model or density of voxels in a voxel model. For example, locations corresponding to a higher density of vertices (or voxels) may be identified as candidates, and candidates can be ranked according to density.

At block 1308, process 1300 can select a preferred location from among the candidate locations, based on an assessment of ease of approach. Ease of approach can be determined based on criteria such as whether any obstacles would prohibit the autonomous vehicle from reaching the candidate location (e.g., if the dirt pile is near some other object, such as a wall, it may not be possible for the autonomous vehicle to maneuver between the wall and the dirt pile), difficulty of traversing intervening terrain, estimated time needed to maneuver the autonomous vehicle into position to scoop at the candidate location (which may lengthen overall time to complete the task), and so on. In some embodiments where candidate locations are ranked, threshold criteria for ease of approach can be defined, and candidate locations can be evaluated in rank order. The first candidate location for which the threshold criteria for ease of approach are satisfied can be selected.

At block 1310, process 1300 can determine an approach vector (i.e., a location and orientation that the autonomous vehicle should attain in order to be in position to pick up material from the selected location. The approach vector can but need not define the entire path that the autonomous vehicle will take from its current location to the target location where pickup will be performed. In some embodiments, a trained RL agent can be used to determine the path from the current location to the approach vector.

Process 1300 is illustrative, and variations and modifications are possible. To the extent logic permits, blocks described sequentially can be performed in parallel, order of operations within or among blocks can be altered, blocks may be omitted, and other operations not specifically described may be performed. It should be noted that process 1300 may yield different approach vectors from one iteration to the next, due to changes in the size and shape of the pile (and possibly due to changes in position of obstacles that may be present in the vicinity of the pile). In some embodiments, process 1300 may also determine an appropriate scooping action, e.g., shortening the scoop in order to avoid getting stuck in the pile of dirt.

Thus, process 1300 can yield the desirable result that the autonomous vehicle does not keep attacking the pile from a single direction but instead varies the direction (much as a human operator might do); however, process 1300 is performed by an automated control system, not by a human being.

It is noted that not all dirt piles are alike. For instance, dirt may be spread out over an area or concentrated in a tall pile. A variety of vehicle types may be used for scooping and moving the dirt, such as a skid steer loader, an excavator, a track hoe, a compact track loader, a wheel loader, backhoe, dozer, loader, scraping equipment etc. In general, to scoop up dirt that is widely spread, the optimal scooping action involves longer scooping movements and a larger number of scooping iterations. In the case of a tall pile, a long scooping movement may risk the vehicle becoming stuck in the dirt. Another option, depending on the type of vehicle, might be to use straight bucket-down movements followed by a lift-bucket. Accordingly, the optimal type of movement can depend on the task and the vehicle. An expert human operator may intuit the optimal movement for a given state of a material pile; however, such intuition is not transferrable to a programmed machine.

Accordingly some embodiments can incorporate a trained RL agent to determine an approach vector and/or a preferred type of scooping action (e.g., length of scoop, angle of the scoop, or the like) for a given iteration. The trained RL agent can be used in connection with process 1300 to determine where (and how) to scoop next. The RL agent can be trained using a simulated environment as described above with reference to FIG. 8. For purposes of training an RL agent to optimize scooping behavior, an input state space $P(s_t)$ can be defined as comprising:

a machine position with respect to a fixed position in the scene;
3D point cloud data (e.g., large data sets composed of 3D point data) from the location of the material pile, which can be derived from camera and/or LIDAR data;
3D point cloud data for the position of the bucket (or other scooping member);
current level of fill in the bucket, which can be extracted from the 3D point cloud data;
an angular joint position of the bucket during the task, which may be a relative angle of the arm to that of the bucket or an absolute angle with respect to a known pose of a base portion of the machine; and
information about dirt getting spilled on the ground or path while being scooped or transported, which can be extracted from image data.

Based on the input state space, an action recommendation from an RL agent, which may be executed by the equipment, is given by an action sequence (also known as policy), $\pi(a_t|s_t)$, wherein an action at comprises one or more locomotion commands to the vehicle, bucket level commands to the bucket/arm controller, and the like.

In this case, the scooping reward function, $r(a_t, s_t)$ is a potential/energy based function which increases with the scooped site reducing its size, i.e., a greater reduction in the amount of material remaining to be scooped corresponds to a higher reward. The time taken to finish the entire task can be negatively rewarded so that the RL agent can learn to scoop the dirt in fewer iterations.

Figure 14:
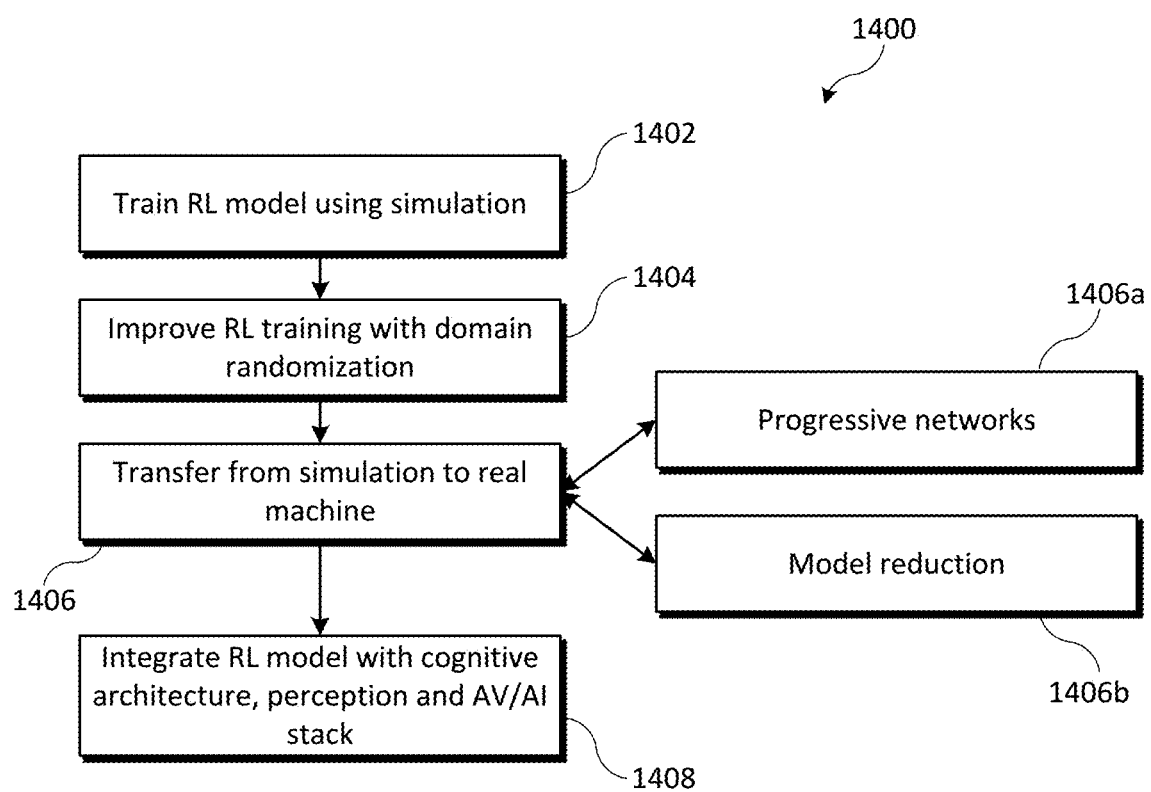
FIG. 14 shows an example of a training process for training an RL agent according to some embodiments.

In some embodiments, training the RL agent may be accomplished using a simulator in a simulated environment, as described above with reference to FIG. 8. FIG. 14 shows an example of a training process 1400 for training an RL agent according to some embodiments. The RL model is initially trained using simulation at block 1402. Next, the model is further trained at block 1404 using additional simulation with domain randomization. Domain randomization facilitates the training of an autonomous agent by allowing it to interact with the environment and adapt to the changing environment by introducing variable dynamics. This is followed by transferring the model from the simulation environment to the real environment at block 1406 with interactions from progressive networks 1406a and model reduction 1406b. The model is deployed on a real-world robot or autonomous agent or autonomous equipment; as shown at block 1408 this deployment can include integrating the RL model with cognitive architecture, perception and the AV/AI stack.

In some embodiment, the trained RL agent can be used during process 1300 of FIG. 13, e.g., to identify candidate locations to scoop at block 1306, to select a preferred location at block 1308, and/or to determine an approach vector for the preferred location at block 1310.

Visual Servo Control of Machine Operations

According to some embodiments, navigation of the autonomous vehicle to a target location (e.g., the approach vector for picking up material or the destination location where the material is to be deposited) as well as the operation of an articulating member (e.g., an arm with a scoop or bucket attached) to perform a material pickup operation can be automated using visual servo techniques.

Visual servo control systems are known in the art. In general, such systems rely on 3D image data from one or more imaging systems (e.g., cameras and/or LIDAR) that may be mounted on a robotic device (or mounted in the environment with a view of the robotic device). A target field of view for the imaging system(s) mounted on the robotic device (or a target pose for the robotic device as viewed from an external imaging system), is defined based on a particular objective to be accomplished. For example, autonomous car-parking may define the target pose based on parking stall lines in a parking lot: a camera mounted in the center of the bumper should be midway between the lines. As another example, a robotic arm may have a target pose to enable grasping of an object. Visual servo control can be provided using a feedback loop in which differences between the current field of view of the imaging system and the target field of view are used to determine control commands to move the robotic device. Typically, the commands are determined using a dynamic model of each available degree of freedom of the robotic device and the effect of motion in each degree of freedom. This type of visual servo control requires a detailed dynamic model that can predict the result of a particular motion in a particular degree of freedom with high accuracy.

Detailed dynamic models are often not practical for vehicles used in heavy industry. For example, a vehicle may operate on muddy or rocky terrain where wheels may slip unpredictably, and performance of a vehicle may depend on how heavily loaded the vehicle is and other factors that confound dynamic models. In addition, a dynamic model is specific to a particular vehicle and cannot be deployed to another vehicle without appropriate modification.

Accordingly, some embodiments use a visual servo technique that does not require a detailed dynamic model of the vehicle (or a robotic component thereof such as an articulating arm). Instead, the control system evaluates the difference between the current field of view (or pose) and the target field of view (or pose), then selects an action to perform that may reduce the difference. Selection can be guided by a rough dynamic model of the vehicle, such as "if the current field of view is to the left of target, turn to the right" or "if the current field of view is too wide, move straight forward." After performing the action, a new image is collected and the process is repeated. If the previous selected action increased, rather than decreased, the difference between the current field of view and the target field of view, the next selected action will tend to be corrective. In some embodiments, the control loop can be executed at high speeds (e.g., once every 100-400 ms or once every 400-800 ms).

Figure 15:
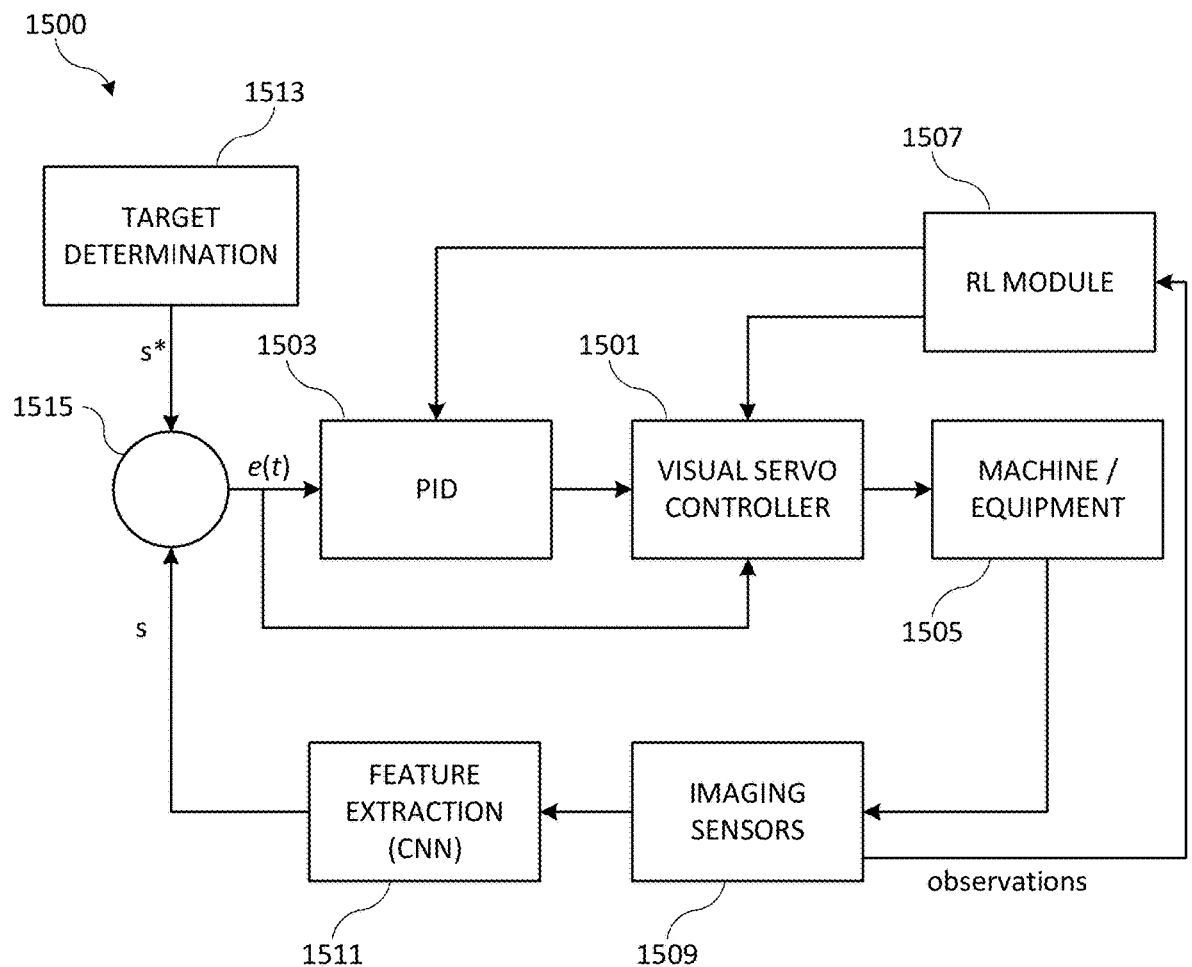
FIG. 15 is a simplified block diagram illustrating an architecture of an autonomous vehicle control system implementing visual servo control with reinforcement learning for performing a task according to some embodiments.

FIG. 15 is a high-level block diagram illustrating an architecture of an autonomous vehicle control system 1500 implementing visual servo control with reinforcement learning for performing a task according to some embodiments. Control system 1500 can perform tasks of navigating through space and/or picking up and lifting material with precision while controlling an autonomous vehicle that may be designed with less precise joints and actuators. Control system 1500 can implement stereo visual servo techniques, Gaussian process based low data complex learning methods, and reinforcement learning techniques.

System 1500 includes modules such as visual servo controller 1501; proportional integral derivative (PID) controller 1503; a machine or other equipment 1505 to carry out mechanical actions such as locomotion, reaching material, picking up material (e.g., by scooping or grasping), and carrying material from one place to another; a reinforcement learning (RL) module 1507; imaging sensor module 1509, which can include one or more cameras, LIDAR systems, etc. to provide 3D imaging capability; and a feature extraction module 1511 to analyze images and extract features therefrom. In some embodiments, feature extraction module 1511 can implement a machine-learned image classifier, such as a convolutional neural network (CNN), that can identify objects within an image. One example of a CNN suitable for use with embodiments described herein is VGG16, a CNN model proposed by K. Simonyan and A. Zisserman. A CNN can be trained to recognize objects in images of various industrial worksites such as construction areas, mines, or the like.

As described above, visual servo control systems employed in automated machines generally have the aim of reducing error, defined generally as a difference between an actual (current) image of a scene and a target view of the scene. In some instances, the camera may be mounted on the machine itself so that the image is what the machine sees, and the target view can be defined based on what the machine would see when it has achieved a desired pose (such as the approach vector described above). In other instances, the camera may be in the environment observing the machine, and the target view can be defined based on how the machine should appear in the image.

In more precise terms, the error at time t (when the current image is acquired) can be defined as:

$$e(t)=s(m(t),a)-s^* \quad (1)$$

where:
  m(t) is a vector comprising a set of image variables (e.g., points) and measurements, which can include image coordinates representing the machine or its field of view at time t;
  a represents a set of parameters or additional information or knowledge about the system, such as information about camera intrinsic parameters or LIDAR+camera fusion data;
  s( ) is a function that depends on the camera(s) used to generate the image;
  s* is the expected value of s(m(t), a) when the machine is in the target pose.

Techniques for specifically defining these parameters are known in the art, and known techniques or other techniques can be implemented in system 1500.

In the case where the camera (or cameras) providing the images are mounted on the machine, visual servo control can be implemented by determining a velocity $V_c$ for the camera (or the machine). For instance, $V_c$ can be defined as:

$$V_c = -\lambda \hat{L}_e^\dagger e(t), \quad (2)$$

where $L_e$ is an interaction matrix. Various techniques can be used to determine the interaction matrix.

In system 1500, $V_c$ is determined using PID controller 1503, which can implement a standard PID control computation:

$$V_c(t) = K_p e(t) + K_i \int_0^t e(t')dt' + K_d \frac{de(t)}{dt} \quad (3)$$

where $K_p$, $K_i$, and $K_d$ are the proportional, integral, and derivative gains. In some embodiments, RL model 1507 can be trained to train the gains as well as other parameters. Training of an RL model can be performed as described above. In some embodiments, RL model 1507 can be initialized using a very rough model of machine response to a particular command, e.g., that sending a "throttle up" command makes the machine move faster, "steer right" increases turning to the right, "raise arm" lifts the arm to a higher position, etc. RL model 1507 can select actions, receive observations of the results, and use the received observations to refine future selections. Alternatively, where RL model 1507 is trained using simulated environments, the initial information at the beginning of training can include a list of available control commands with no information about what the commands do, and RL model 1507 can begin training by selecting commands at random; improved selections for a given state can be learned through training. In some embodiments, RL model 1507 may be trained initially using simulations prior to deployment in a real vehicle; after deployment, RL model 1507 can continue to collect observations during operation and refine the model.

In some embodiments, image data is provided by imaging sensors 1509, which can include a combination of cameras and/or LIDAR systems that provide a 3D image of the environment. Multiple cameras (and/or LIDAR systems)

may be mounted on the machine. For example, if the machine is a loader, one camera may be mounted on the right front side of the machine and another camera may be mounted on the left front side of the machine, providing a stereo view of the area in front of the machine and enabling visual servo control of locomotion. Additionally, one or more cameras may be mounted on the arm of the machine to enable visual servo control of arm articulation as well as locomotion. Other arrangements of cameras, LIDAR, and/or other imaging systems can also be used.

In operation, feature extraction module 1511 operates on the image data to identify objects or features in the image and compute the function s(m(t), a). Target determination module 1513 provides the target value s*. For instance, target determination module 1513 can implement process 1300 described above to determine an approach vector, generate a target image based on the approach vector, and compute the function s( ) using the target image and the same camera and other parameters used by feature extraction module 1511. Arithmetic unit 1515 computes the error e(t) according to Eq. (1). PID controller 1503 computes Eq. (3) using the error received from arithmetic unit 1515 and gains provided by RL module 1507 and sends the resulting $V_c(t)$ to visual servo control module 1501. Using the model of machine behavior provided by RL module 1507 and the desired $V_c(t)$ provided by PID controller 1503, visual servo control module 1501 determines one or more commands to be sent to machine 1505 and sends the commands. Machine 1505 executes the commands, and the effect can be determined by looking at subsequent data from imaging sensors 1509.

Accordingly, system 1500 can operate in a feedback loop in which visual servo controller 1501 applies a movement command intended to bring machine/equipment 1505 into closer alignment with a target pose (which can be an approach vector as described above), observes the result (which can be the change in the error function), and applies a subsequent movement command based on the result. In some embodiments, the feedback loop is executed at a high rate (e.g., cycle time of around 100 ms, 400-500 ms, or 400-800 ms) so that any overshoot or undershoot in actual movement can be corrected before large deviations in course occur. In addition, in some embodiments RL module 1507 can learn from observations and refine the model of machine behavior over time. Thus, it is not necessary to provide a precise dynamic model of the machine behavior.

Figure 16:
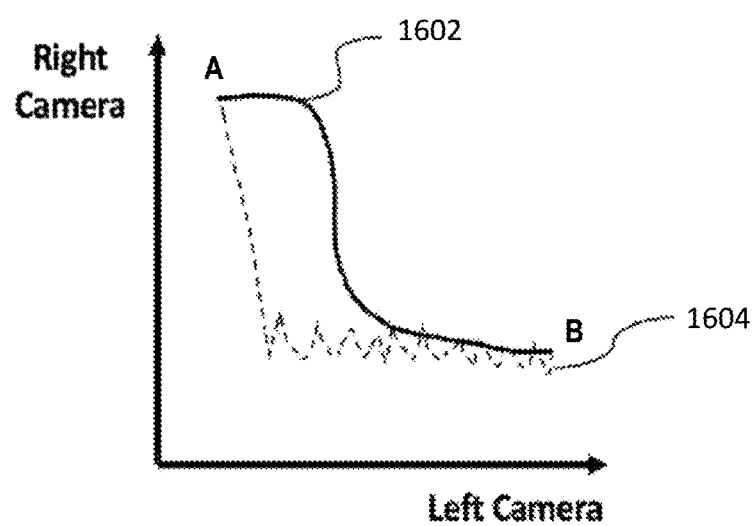
FIG. 16 illustrates an optimal path for a machine that can be provided using system according to some embodiments.

FIG. 16 illustrates an optimal path for a machine that can be provided using system 1500 according to some embodiments. Line 1602 represents the trajectory of a particular point in an image as a vehicle with two stereoscopic cameras moves from a starting position (A) to a target position (B), as seen from a "left camera" and a "right camera" when system 1500 is used for visual servo control. More specifically, the points on the line correspond to motion of the target in each camera's epipolar line. For comparison, dashed line 1604 represents a trajectory of the same point when using a system that implements a conventional "optimal control" technique. As can be seen, the conventional system essentially optimizes the right camera view first, then optimizes the left camera view while limiting deviations introduced in the right camera view. In contrast, using system 1500 provides a smoother trajectory (line 1602) in which the left-camera and right-camera views concurrently approach the target position.

System 1500 can be used in the context of locomotion, to autonomously drive a vehicle to a target location such as an approach vector for picking up material or a destination location for depositing material. System 1500 can also be used to control articulating members of the vehicle (e.g., arms, scoops, pincers, etc.) in order to perform the pickup and deposit of material. Simulated environments can be used to train RL models with appropriate gain values for each phase of operation, including gains associated with locomotion and (presumably different) gains associated with operation of an articulating member.

Figure 17:
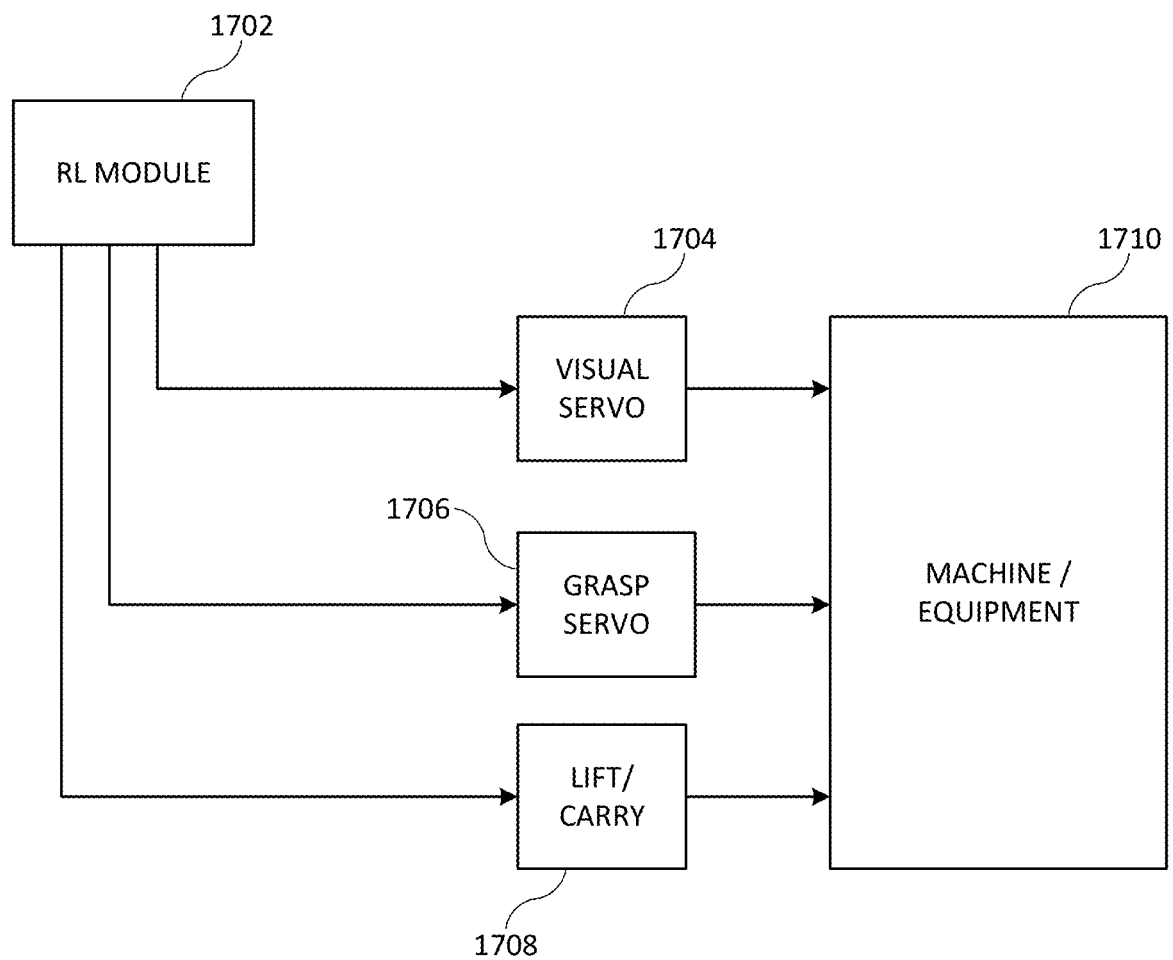
FIG. 17 illustrates an RL module enabling servo control of multiple aspects of operation of an autonomous vehicle according to some embodiments.

In some embodiments, a similar servo control loop can also be used to control other actions of the machine. For instance, an autonomous vehicle may be able to grasp and carry various objects such as pallets, beams, concrete blocks, or the like. As the machine lifts and carries the material, changes in static friction, center of gravity, and other aspects of physical state may alter the grasping force needed to secure the material. Accordingly, it may be desirable to control the grasping force using a servo control loop. In this case, in addition to or instead of visual servo control based on image data, other sensors can be used to provide feedback. For instance, vibration sensors or force sensors can be used for slip detection, and actual sensor readings can be compared to target sensor readings (indicative of no slip) to provide an error function that can be used to determine adjustments to the grasping force. Similarly, lifting force and other forces associated with carrying of material (e.g., compensation for the weight of the load and/or shifting of the load during vehicle motion) may also be controlled using servo models similar to that of FIG. 15. FIG. 17 illustrates an RL module 1702 providing models for visual servo module 1704, grasping servo module 1706, and lift/carry servo module 1708, thereby enabling servo control of multiple aspects of operation of machine/equipment 1710.

It will be appreciated that the visual servo control systems described herein are illustrative and that variations and modifications are possible. Different combinations of sensor systems may be used for image generation, and any aspect of machine operation can be controlled, including locomotion, orientation or reorientation in space, movement of articulating members, and so on.

Further, embodiments described above assume that an approach vector (or target pose) is chosen once per iteration of a material-moving operation. In some embodiments, as the machine moves toward a target pose, additional information about the material may become apparent. For instance, if the machine is moving around a dirt pile to approach it from the side, portions of the dirt pile that were not previously visible to the sensors (e.g., camera and/or LIDAR) may become visible. In some embodiments, this information can be used to dynamically reevaluate the choice of approach vector (or other target pose) as the machine approaches the source location. For instance, in system 1500 of FIG. 15, target determination module 1513 can periodically re-execute process 1300 while machine 1505 is in motion toward the approach vector. Re-execution of process 1300 can occur at a slower rate than the rest of the visual servo feedback loop, or it can be conditioned on specific events. For instance, process 11300 can be re-executed when a sufficient change in the angle of view of the source location occurs, or when potential obstacles appear in or disappear from the field of view.

Other Operations on Material

The foregoing description makes reference to the specific task of moving a dirt pile. However, many other tasks performed at industrial sites also involve a machine iteratively moving material from one location to another, such as moving rocks or debris, or moving discrete objects (e.g., pallets, blocks, beams, or the like) from a pile or stack that may not be neatly organized. Where the material is not neatly organized, and/or where removing a portion of the material may alter the organization of the remaining material, techniques described herein can be applied to allow an autonomous machine to determine in real time the next portion of the material to remove, without the need for human intervention. Various techniques to determine the next portion of material to remove may also be used, depending in part on the nature of the material. One example is described above in the context of a dirt pile, which may also apply to piles of other material that can be scooped. Additional examples will now be described.

As a first example, discrete objects (e.g., pallets, blocks, beams, or the like) at a source location (e.g., inside a truck or at a loading site) may be lifted and carried to a destination location. In some embodiments, an autonomous vehicle, such as a robotic loader, can travel to the source location, identify the objects to be lifted and carried away, then perform the lifting and carrying operation, which may require several iterations. In some instances, objects may be placed at random positions or in random orientations. At each iteration, the autonomous vehicle can use techniques similar to those described above to determine which object(s) to pick up next and determine the approach vector for picking up the next object. In addition, the autonomous vehicle can use techniques described above or similar techniques to determine how to operate a lifting or grasping member to lift and carry the object without damaging or breaking it.

As a second example, material that is being carried may be dumped or deposited at a destination location (e.g., in connection with processes described above). In some embodiments, it may be desirable to deposit material in an orderly manner (e.g., to make a neat stack or compact pile or to deposit the material into a confined area such as a trailer or truck bed). Other embodiments may involve edge dumping, where the autonomous vehicle approaches the edge of a berm and dumps material onto or over the berm.

The task of dumping material using conventional programming or pre-programming is complex and inefficient, particularly due to the many variables associated with the nature of the task. One such variable is that dumping the material may change the shape of the dumping ground, such as when adding more material to an existing pile of dirt alters the shape dynamics of the pile of dirt. The pile of dirt could grow taller or spread wider on the ground or could distribute itself unevenly on the ground. Accordingly, the next time the machine dumps material it needs take into consideration the spread, height, and breadth of materials. In some embodiments, an autonomous vehicle can be trained to select a dumping location for a particular load using reinforcement learning as described above with a reward function that is proportional to the profile of the desired dump. For instance, if the desired shape is a cone, any dumping which does not contribute to a conical shape would be negatively rewarded.

As a third example, material may be spread over an area using an autonomous vehicle. The task may involve spreading the material evenly or as per a required gradient over a defined area. Similarly, a task may involve compacting material dispersed over an area to a desired thickness or density, or to a desired gradient thickness with a variety of tilt profiles. Challenges in this context include modeling how the material responds to a certain action by the vehicle (e.g., the effect of applying a particular force to a member that can push or scrape the material).

In some embodiments, the training of an RL agent for such tasks can be carried out using a simulator by providing a simulated environment, as descried above. Domain randomization can include changing a range of variables for different parameters to represent different configurations and different material properties. For example, material properties can be simulated via material stickiness, types of material in a pile, different shapes of material in a pile, weight, density, particle size, variation in particle size, viscosity and more particle properties. Dirt can be further modeled with many random shaped particles and further properties, in order to provide degrees of variability in simulation. For a given material, kinematics-based models, such as those with high level dynamics, non-contact or smoothed contact dynamics, can be used for simulating changes in the state of the material (e.g., density, thickness, etc.) in response to machine action.

As a fourth example, drilling or digging also involves removal of material. Variables in this context may include variations in soil or material viscosities, densities etc. In addition, as material is dug or drilled out from the ground, the shape of the ground may change. Therefore, the next time the autonomous vehicle approaches the drilling or digging site, it needs to adapt its course to changes in the spread, height, and breadth of materials. In some embodiments, this can be facilitated by defining the reward function to be proportional to the profile of the desired dug-out shape. For instance, if the desired shape is a trench (or open pit or semi-spherical pit etc.), any drilling or digging which does not contribute to the desired shape would be negatively rewarded.

These examples illustrate that a combination of reinforcement learning and visual servo control techniques as described herein can be used to enable autonomous vehicles to perform a variety of material-moving tasks in time-varying environments in an efficient manner.

Computer System Implementation

Figure 18:
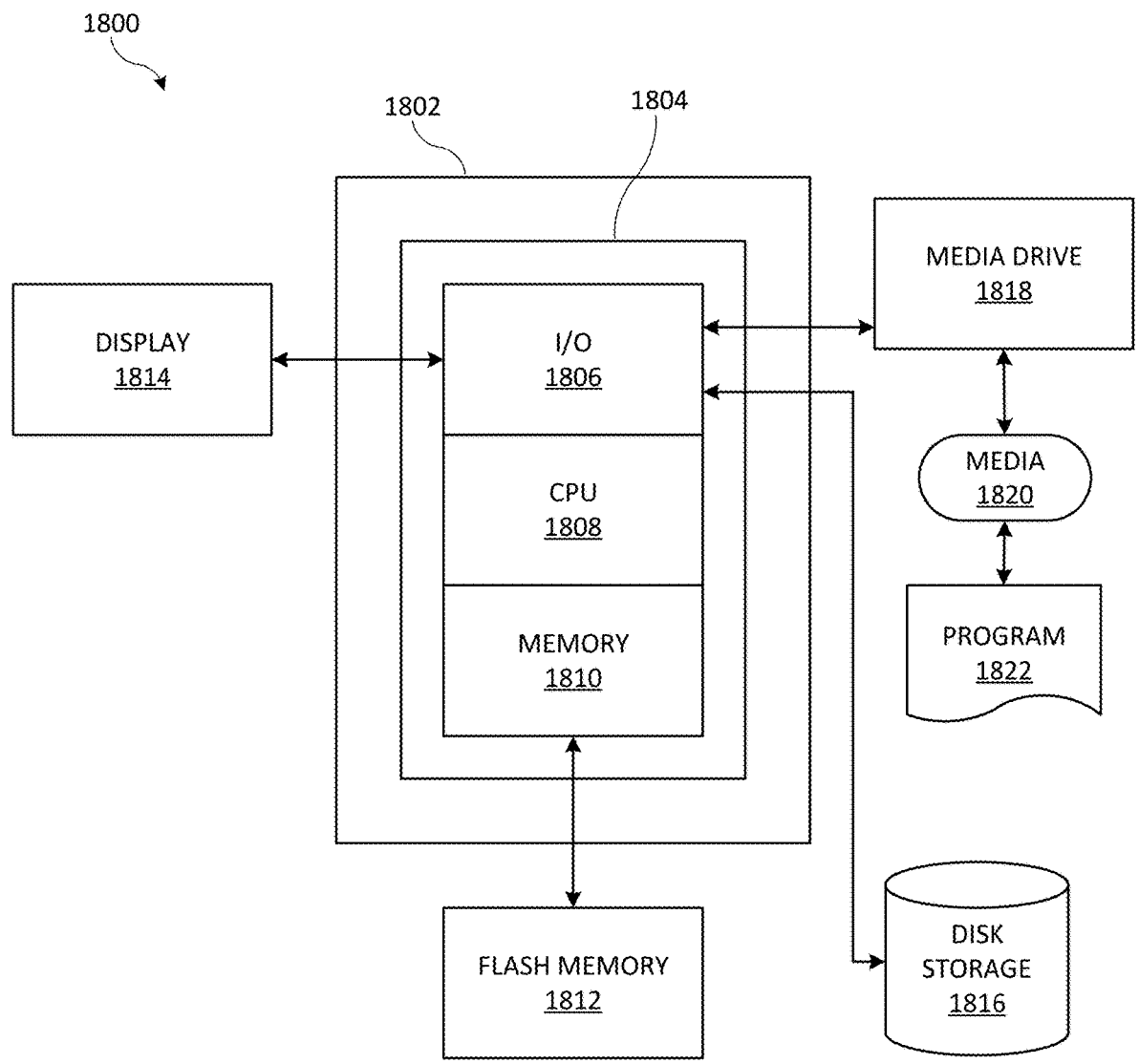
FIG. 18 depicts an exemplary computing system that can be configured to perform various processes described herein.

The foregoing and other embodiments can be implemented using computer systems of generally conventional design. FIG. 18 depicts an exemplary computing system 1800 that can be configured to perform any one or more of the processes provided herein. In this context, computing system 1800 may include, for example, a processor, memory, storage, and I/O devices (e.g., monitor, keyboard, disk drive, Internet connection, etc.). However, computing system 1800 may include circuitry or other specialized hardware for carrying out some or all aspects of the processes. In some operational settings, computing system 1800 may be configured as a system that includes one or more units, each of which is configured to carry out some aspects of the processes either in software, hardware, or some combination thereof.

Computing system 1800 includes a number of components that may be used to perform any of the processes described herein. A main system 1802 includes a motherboard 1804 having an I/O section 1806, one or more central processing units (CPU) 1808, and a memory section 1810, which may have a flash memory card 1812 or other storage media related to it. I/O section 1806 can be connected to a display 1814, a keyboard and/or other user input (not shown), a disk storage unit 1816, and a media drive unit 1818. Media drive unit 1818 can read/write a computer-readable storage medium 1820, which can contain programs 1822 and/or data. Moreover, it is noted that computing system 1800 can be configured to include additional systems in order to fulfill various functionalities. Computing system 1800 can communicate with other computing devices using various computer communication protocols such as a Wi-Fi, Bluetooth® (and/or other standards for exchanging data over short distances includes those using short-wavelength radio transmissions), USB, Ethernet, cellular, an ultrasonic local area communication protocol, etc.

It should be understood that embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using various combinations of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable storage medium; suitable media include random access memory (RAM), a read only memory (ROM), a magnetic medium such as a hard-drive or a floppy disk, or an optical medium such as a compact disk (CD) or DVD (digital versatile disk), flash memory, or the like. The computer readable storage medium may be any combination of such storage devices. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. Such programs may also be encoded and transmitted using carrier signals adapted for transmission via wired, optical, and/or wireless networks conforming to a variety of protocols, including the Internet; however, the term "computer-readable storage medium" excludes transitory signals.

Any of the methods described herein may be totally or partially performed with a computer system including one or more processors, which can be configured to perform the steps. Thus, embodiments can involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

Additional Embodiments

As described above, reinforcement learning and visual servo techniques can be used in combination to enable an autonomous vehicle to perform an iterative task such as moving material from a source location to a destination location without relying on a preprogrammed path. Instead, the autonomous vehicle can use a trained RL model to determine an approach vector to the source location for each iteration, taking into account changes in the distribution or arrangement of material at the source location that may have resulted from previous iterations or other activities. The autonomous vehicle can execute the approach under control of a visual servo control system that does not require a detailed or precise dynamic model of the autonomous vehicle. In some embodiments, the approach to the source location can be modified while the autonomous vehicle is in motion, e.g., based on additional information about the characteristics of the material to be moved, such additional information about the shape of a pile as the pile is viewed from different angles. After approaching the source location, the autonomous vehicle can use visual servo control of an articulating member to pick up (e.g., by scooping or grasping) a portion of the material. The particular path for the articulating member, like the approach to the source location, can be determined using an RL model. Likewise, the autonomous vehicle can use the visual servo control system to navigate to the destination location and to release the material. In some embodiments, the approach to the destination location can be selected for each iteration in a similar manner to selecting the approach to the source location, and control of material release can be similar to control of material pickup.

While the invention has been described with reference to specific embodiments, it will be appreciated that many variations and modifications are possible. The specific details of particular embodiments may be combined in any suitable manner without departing from the spirit and scope of embodiments of the invention. However, other embodiments of the invention may be involve specific embodiments relating to each individual aspect, or specific combinations of these individual aspects.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

The above description is illustrative and is not restrictive. Many variations of the invention will become apparent to those skilled in the art upon review of the disclosure. The scope of patent protection should, therefore, be determined not with reference to the above description, but instead should be determined with reference to the following claims along with their full scope or equivalents.

What is claimed is:

1. A method for controlling an autonomous vehicle, the method comprising:
   receiving, at a control system of the autonomous vehicle, an instruction to move material from a source location to a destination location, wherein moving all of the material requires a plurality of iterations of a transfer operation;
   identifying, by the control system of the autonomous vehicle, the source location within an image provided by sensors of the autonomous vehicle;
   for each iteration of the transfer operation:
   determining, by the control system of the autonomous vehicle, an approach vector specifying a location and orientation of the autonomous vehicle for beginning to pick up a portion of the material, wherein the approach vector is different for different iterations;

determining, by the control system of the autonomous vehicle, a current location of the autonomous vehicle relative to the approach vector;

executing, by the control system of the autonomous vehicle, a visual servo control loop to navigate the autonomous vehicle from the current location to the approach vector, wherein executing the visual servo control loop includes iteratively determining a current view based on sensor data, comparing the current view to a target view defined based on the approach vector, determining a next incremental move to decrease a difference between the current view and the target view, and executing the next incremental move;

while executing the visual servo control loop, dynamically reevaluating the approach vector based on additional sensor data acquired during execution of the visual servo control loop;

after reaching the approach vector, operating, by the control system of the autonomous vehicle, the autonomous vehicle to pick up a portion of the material;

executing, by the control system of the autonomous vehicle, the visual servo control loop to move the autonomous vehicle to the destination location; and after reaching the destination location, operating, by the control system of the autonomous vehicle, the autonomous vehicle to release the portion of the material; and performing additional iterations of the transfer operation until all of the material has been moved.

2. The method of claim 1 wherein the material is arranged in a pile.

3. The method of claim 2 wherein the approach vector is determined based on a shape of the pile.

4. The method of claim 2 wherein determining the approach vector includes:

generating a three-dimensional (3D) model of the pile based on sensor data;

identifying one or more candidate locations based on the 3D model;

selecting a preferred location from among the candidate locations based on a set of criteria that includes one or more of:
  presence of obstacles near the candidate location;
  difficulty of traversing intervening terrain between the current location and the candidate location; or
  estimated time to navigate the autonomous vehicle to the candidate location; and determining an approach vector that enables the autonomous vehicle to pick up material at the preferred location.

5. The method of claim 4 wherein the 3D model is a mesh model and wherein the one or more candidate locations are identified as one or more locations having a highest density of vertices in the mesh model.

6. The method of claim 1 wherein the visual servo control loop is based on real-time image data from the sensors of the autonomous vehicle.

7. The method of claim 1 wherein the visual servo control loop determines a control command for the next incremental move based on a reinforcement learning model that is independent of a kinematic model of the autonomous vehicle.

8. A control system for an autonomous vehicle, the control system comprising:

a set of sensors to collect sensor data from an environment around an autonomous vehicle;

a processor coupled to the set of sensors and configured to:
  receive an instruction to move material from a source location to a destination location, wherein moving all of the material requires a plurality of iterations of a transfer operation;
  identify the source location within an image generated from the sensor data;
  for each iteration of the transfer operation:
    determine an approach vector specifying a location and orientation of the autonomous vehicle for beginning to pick up a portion of the material, wherein the approach vector is different for different iterations;
    determine a current location of the autonomous vehicle relative to the approach vector;
    execute a visual servo control loop to navigate the autonomous vehicle from the current location to the approach vector, wherein executing the visual servo control loop includes iteratively determining a current view based on sensor data, comparing the current view to a target view defined based on the approach vector, determining a next incremental move to decrease a difference between the current view and the target view, and executing the next incremental move;
    while executing the visual servo control loop, dynamically reevaluate the approach vector based on additional sensor data acquired during execution of the visual servo control loop;
    after reaching the approach vector, operate the autonomous vehicle to pick up a portion of the material;
    execute the visual servo control loop to move the autonomous vehicle to the destination location; and
    after reaching the destination location, operate the autonomous vehicle to release the portion of the material; and
  perform additional iterations of the transfer operation until all of the material has been moved.

9. The control system of claim 8 wherein the set of sensors includes at least two cameras arranged to provide a stereo view of an area around the autonomous vehicle.

10. The control system of claim 8 wherein the set of sensors includes at least one camera and a LIDAR subsystem arranged to provide a view of an area around the autonomous vehicle.

11. The control system of claim 8 wherein the material is arranged in a pile and wherein the approach vector is determined based on a shape of the pile.

12. The control system of claim 11 wherein determining the approach vector includes:

generating a three-dimensional (3D) model of the pile based on sensor data;

identifying one or more candidate locations based on the 3D model;

selecting a preferred location from among the candidate locations based on a set of criteria that includes one or more of:
  presence of obstacles near the candidate location;
  difficulty of traversing intervening terrain between the current location and the candidate location; or estimated time to navigate the autonomous vehicle to the candidate location; and determining an approach vector that enables the autonomous vehicle to pick up material at the preferred location.

13. The control system of claim 12 wherein the 3D model is a mesh model and wherein the one or more candidate locations are identified as one or more locations having a highest density of vertices in the mesh model.

14. The control system of claim 8 wherein the visual servo control loop is based on real-time image data from the sensors of the autonomous vehicle.

15. The control system of claim 8 wherein the visual servo control loop determines a control command for the next incremental move based on a reinforcement learning model that is independent of a kinematic model of the autonomous vehicle.

16. A computer-readable storage medium having stored therein program instructions that, when executed by a processor in a control system for an autonomous vehicle, cause the processor to perform a method comprising:

receiving an instruction to move material from a source location to a destination location, wherein moving all of the material requires a plurality of iterations of a transfer operation;

identifying the source location within an image provided by sensors of the autonomous vehicle;

for each iteration of the transfer operation:
  determining an approach vector specifying a location and orientation of the autonomous vehicle for beginning to pick up a portion of the material, wherein the approach vector is different for different iterations;
  determining a current location of the autonomous vehicle relative to the approach vector;
  executing a visual servo control loop to navigate the autonomous vehicle from the current location to the approach vector, wherein executing the visual servo control loop includes iteratively determining a current view based on sensor data, comparing the current view to a target view defined based on the approach vector, determining a next incremental move to decrease a difference between the current view and the target view, and executing the next incremental move;
  while executing the visual servo control loop, dynamically reevaluating the approach vector based on additional sensor data acquired during execution of the visual servo control loop;
  after reaching the approach vector, operating the autonomous vehicle to pick up a portion of the material;
  executing the visual servo control loop to move the autonomous vehicle to the destination location; and
  after reaching the destination location, operating the autonomous vehicle to release the portion of the material; and performing additional iterations of the transfer operation until all of the material has been moved.

17. The computer-readable storage medium of claim 16 wherein the material is arranged in a pile and the approach vector is determined based on a shape of the pile.

18. The computer-readable storage medium of claim 17 wherein determining the approach vector includes:
  generating a three-dimensional (3D) model of the pile based on sensor data;
  identifying one or more candidate locations based on the 3D model;
  selecting a preferred location from among the candidate locations based on a set of criteria that includes one or more of:
    presence of obstacles near the candidate location;
    difficulty of traversing intervening terrain between the current location and the candidate location; or
    estimated time to navigate the autonomous vehicle to the candidate location; and
  determining an approach vector that enables the autonomous vehicle to pick up material at the candidate preferred location.

19. The computer-readable storage medium of claim 16 wherein the visual servo control loop is based on real-time image data from the sensors of the autonomous vehicle.

20. The computer-readable storage medium of claim 16 wherein the visual servo control loop determines a control command for the next incremental move based on a reinforcement learning model that is independent of a kinematic model of the autonomous vehicle.

* * * * *